United States Patent
Takimoto

(10) Patent No.: US 8,286,091 B2
(45) Date of Patent: Oct. 9, 2012

(54) IMAGE DISPLAY CONTROLLING APPARATUS, IMAGE DISPLAY CONTROLLING METHOD, AND PROGRAM

(75) Inventor: Yuuji Takimoto, Tokyo (JP)

(73) Assignee: Sony Corporation (JP)

( * ) Notice: Subject to any disclaimer, the term of this patent is extended or adjusted under 35 U.S.C. 154(b) by 807 days.

(21) Appl. No.: 12/008,753

(22) Filed: Jan. 14, 2008

(65) Prior Publication Data

US 2008/0172410 A1  Jul. 17, 2008

(30) Foreign Application Priority Data

Jan. 17, 2007  (JP) .............................. P2007-008587

(51) Int. Cl.
*G06F 3/048* (2006.01)

(52) U.S. Cl. ........ 715/798; 707/103; 715/204; 715/838; 382/305

(58) Field of Classification Search .................. 707/103, 707/E17.019; 715/204
See application file for complete search history.

(56) References Cited

U.S. PATENT DOCUMENTS

| | | | |
|---|---|---|---|
| 5,276,805 A * | 1/1994 | Hamaguchi .................. 345/537 |
| 6,011,897 A | 1/2000 | Koyama et al. |
| 6,112,010 A | 8/2000 | Koyama et al. |
| 6,504,571 B1 * | 1/2003 | Narayanaswami et al. ......................... 348/231.99 |
| 7,644,373 B2 * | 1/2010 | Jing et al. ...................... 715/838 |
| 2005/0102609 A1 * | 5/2005 | Izume et al. .................. 715/512 |
| 2005/0257152 A1 * | 11/2005 | Shimizu et al. ............... 715/723 |
| 2006/0036662 A1 * | 2/2006 | Cornell ......................... 707/205 |
| 2008/0091745 A1 * | 4/2008 | Malik ........................... 707/204 |
| 2008/0118120 A1 * | 5/2008 | Wegenkittl et al. ........... 382/128 |
| 2008/0118160 A1 * | 5/2008 | Fan et al. ...................... 382/225 |

FOREIGN PATENT DOCUMENTS

| | | |
|---|---|---|
| CN | 1393869 A | 1/2003 |
| JP | 11-290279 A | 10/1999 |
| JP | 2000-041209 A | 2/2000 |
| JP | 2005-033711 A | 2/2005 |
| JP | 2005-236891 A | 9/2005 |

OTHER PUBLICATIONS

David A. Karp, Tim O'Reilly, Troy Mott; Windows XP in a Nutshell, Second Edition; Chapter 4. Windows XP Applications and Tools; p. 114; Print ISBN-13: 978-0-596-00900-7; Pub. Date: Jan. 31, 2005.*
Office Action from Chinese Application No. 2008-10003306.7, dated Jan. 29, 2010.

* cited by examiner

*Primary Examiner* — Mark Rinehart
*Assistant Examiner* — Di Xiao
(74) *Attorney, Agent, or Firm* — Lerner, David, Littenberg, Krumholz & Mentlik, LLP

(57) ABSTRACT

An image display controlling apparatus, including an image-data maintaining section for maintaining a plurality of image data, a link management section for managing a link representing a parent-child relationship of parent image data and child image data between two image data in the plurality of image data, an operation receiving section for receiving operation input relating to a display of the plurality of image data, and a display controlling section for controlling such that switching is performed between a whole display in which all of the plurality of image data is subject to be displayed and a digest display in which image data other than those which are the child image data by the link, out of the plurality of image data, are subject to be displayed in response to the operation input.

13 Claims, 18 Drawing Sheets

IMAGE DISPLAY CONTROLLING APPARATUS, IMAGE DISPLAY CONTROLLING METHOD, AND PROGRAM

CROSS-REFERENCE TO RELATED APPLICATIONS

The present application claims priority from Japanese Patent Application No. JP 2007-008587 filed in the Japanese Patent Office on Jan. 17, 2007, the entire content of which is incorporated herein by reference.

BACKGROUND OF THE INVENTION

1. Field of the Invention

The present invention relates to an image display controlling apparatus. More particularly, an embodiment of the present invention relates to an image display controlling apparatus for displaying image data stored in a recording medium, and a processing method therefore and a program for causing a computer to execute the method.

2. Description of the Invention

Recently, as a capacity of a recording medium becomes large, the number of images which can be taken by an image-capture device increases. As a result, an image-capture mode preferred by a person taking an image varies, and there is a tendency that the number of images to be taken about the same subject increases as well. That is, a plurality of image data having similar imaging contents tends to exist. In this manner, when the number of image data and that having similar contents each other increases, management of image data becomes complicated.

To accommodate this, an image display controlling apparatus of the related art classifies the image data according to an imaged date and time or a specific category for display. For example, an information processing apparatus in which image files are classified into categories for management is proposed in Japanese Patent Application Publication No. JP 2005-33711, FIG. 1 (Patent Document 1).

SUMMARY OF THE INVENTION

However, in the case where a plurality of image data having similar imaging contents exist, if the image data are sequentially viewed in imaged order, a user has to view the similar image data more than one time. As a result, a user is forced to skip the image data frequently. Further, when a person takes images according to his mood, the same object is not necessarily imaged chronologically, and thus, it may become difficult to search the necessary image data.

On the other hand, to classify the image data into categories, it may be necessary to set a category based on a certain standard, but an issue as to appropriate level of category depends on a content of the image data, and thus, is not necessarily a simple task.

Therefore, it is desirable that an association between imaged image data is flexibly managed to allow easy viewing of a plurality of relevant image data.

According to a first embodiment of the present invention, there is provided an image display controlling apparatus including an image-data holding section for holding a plurality of image data, link management section for managing a link representing a parent-child relationship of parent image data and child image data between two image data in the plurality of image data, operation receiving section for receiving operation input relating to a display of the plurality of image data, and display controlling section for controlling to switch, in response to the operation input, between a whole display in which all of the plurality of image data are subject to display and a digest display in which image data other than those which are the child image data by the link, out of the plurality of image data, are subject to display. As a result, the display of the image data is switched to either the whole display or the digest display in response to the link relating to the parent-child relationship between the image data, thereby providing an effect of easy viewing.

In the first embodiment, the display controlling section may control such that in the whole display, the child image data is displayed behind the parent image data thereof. This provides an effect of clearly showing the parent-child relationship of the image data displayed by the whole display.

Further, in the first embodiment, the image-data holding section may hold a predetermined date and time accompanied with each of the plurality of image data, and display controlling section may control such that the image data other than those which are the child image data by the link may be displayed chronologically in response to the predetermined date and time accompanied with each image data. This provides an effect of chronologically displaying the parent image data and image data having no link.

In the first embodiment, the display controlling section may control such that in the whole display, the child image data is displayed to be smaller than the parent image data. This provides an effect for clearly showing the parent-child relationship of the image data displayed by the whole display.

In the first embodiment, the image-data holding section may hold a hidden image attribute which accompanies each of the plurality of image data for showing whether the image data will be hidden, and the display controlling section may control, in response to the operation input, whether the image data set to be hidden by the hidden image attribute will be displayed or not. This provides an effect of changing the presence or absence of a display of the image data of the hidden image attribute in response to the predetermined operation input. In this case, the display controlling section may control such that the image data is displayed translucently when the image data set to be hidden by the hidden image attribute is displayed. This provides an effect of clearly showing that the hidden image attribute is set to the image data.

In the first embodiment, the operation receiving section may receive an operation for placing an icon indicating the second image data on a display area indicating the first image data in the plurality of image data, and the display controlling section may cause the link management section to hold a new link in which the first image data is set as the parent image data and the second image data is set as the child image data. This provides an effect enabling setting of a link relating to the parent-child relationship of the image data by an operation of placing the icon indicating the image data over the area.

In the first embodiment, the operation receiving section may receive an operation of placing an icon indicating any one of the plurality of image data over an area for receiving a link cancel, and the display controlling section may cause the link management section to cancel a link associated with the image data indicated by the icon. This provides an effect enabling cancel of a link relating to the image data by an operation of placing an icon which shows the image data over an area for receiving a link cancel.

In the first embodiment, the link management section may further manage a link representing a parent-child relationship between a specific position in the parent image data and the child image data, and the display controlling section may control such that the child image data is displayed in the specific position in the parent image data. This provides an effect enabling easy view of the child image data associated with the parent image data in response to the link showing relation between the specific position in the parent image data and the child image data. In this case, characteristics reside in that the operation receiving means receives an operation of placing an icon indicating the second image data on a specific position in the display area indicating the first image data in the plurality of image data, and the display controlling section causes the link management section to hold a new link in which the specific position in the first image data is set as a specific position in the parent image data and the second image data is set as the child image data. This provides an effect enabling setting a link of the child image data is to the specific position in the parent image data.

Further, a second embodiment of the present invention is an image display controlling method in an image display controlling apparatus including an image-data holding section for holding a plurality of image data and link management section for managing a link representing a parent-child relation of parent image data and child image data between two image data in the plurality of image data. Characteristics of the image display controlling method reside in that, the method includes an operation receiving procedure for receiving operation input relating to a display of the plurality of image data and a display controlling procedure for switching, in response to the operation input, between a whole display in which all of the plurality of image data are subject to display and a digest display in which image data other than those which becomes the child image data by the link, out of the plurality of image data, are subject to display. The second embodiment of the present invention also is a program causing a computer to execute these procedures. As a result, based on the link relating to the parent-child relationship between the image data, a display of the image data is switched between the whole display or the digest display to enable easy viewing.

DETAILED DESCRIPTION OF THE EMBODIMENT

With reference to drawings, an embodiment of the present invention will be described in detail.

Figure 1:
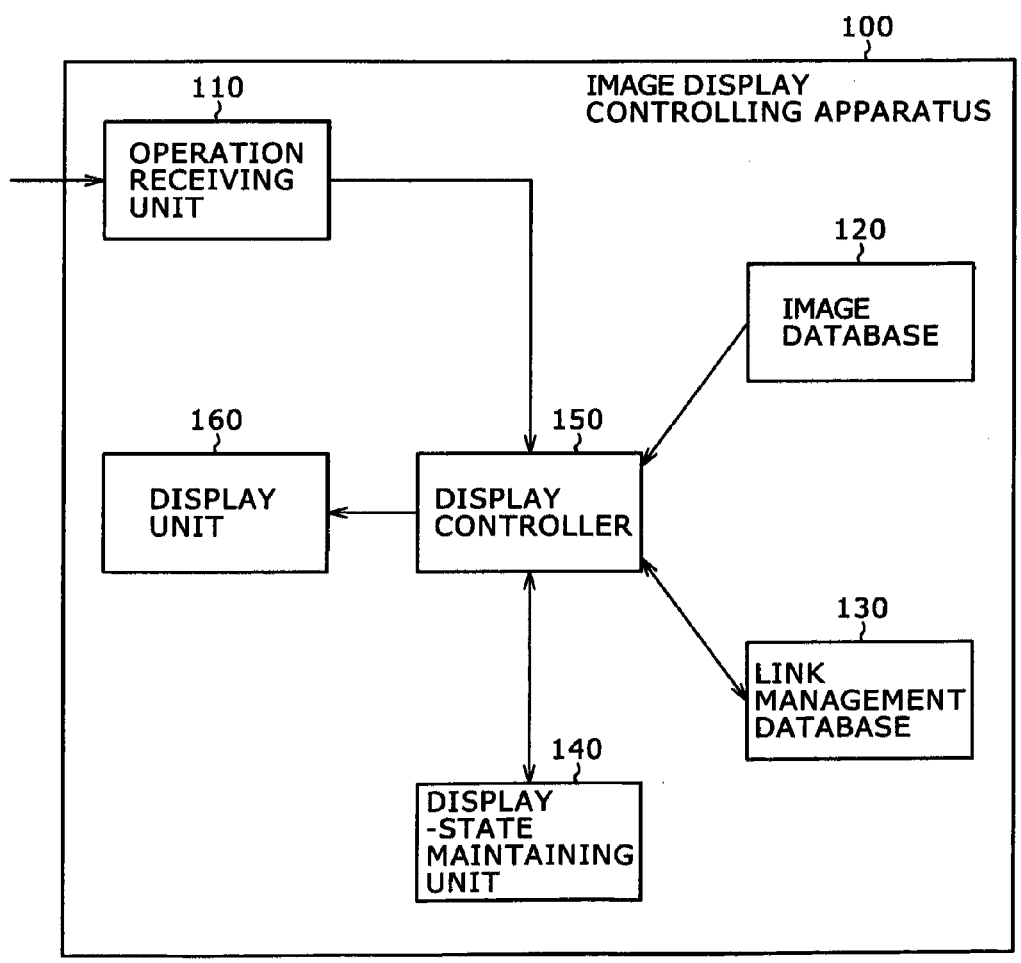
FIG. 1 is a block diagram showing a functional configuration example of an image display controlling apparatus 100 according to an embodiment of the present invention.

FIG. 1 is a block diagram showing a functional configuration example of an image display controlling apparatus 100 according to the embodiment of the present invention.

The image display controlling apparatus 100 includes an operation receiving unit 110, an image database 120, a link management database 130, a display-state maintaining unit 140, a display controller 150, and a display unit 160.

The operation receiving unit 110 receives operation input regarding relevancy between image data to supply to the display controller 150. The operation receiving unit 110 is realized by an input device such as a mouse, for example.

The image database 120 stores image data displayed to the display unit 160 and metadata accompanying the image data. The metadata includes an imaged date and time, an imaging environment of image data.

The link management database 130 is adapted to manage a link indicating a parent-child relationship among a plurality of image data stored in the image database 120. By the link, between the two image data, one of them becomes parent-image data and another image data becomes a child-image data. That is, when a plurality of relevant image data exists, the representative image data is the parent image data and the remaining image data are child-image data. The link is updated by the display controller 150 in response to operation input regarding a link received by the operation receiving unit 110.

The display-state maintaining unit 140 maintains display state indicating which display screen is displayed to the display unit 160, out of a plurality of display screens. The display state maintained by the display-state maintaining unit 140 is updated by the display controller 150 in response to operation input regarding switching of display received by the operation receiving unit 110.

The display controller 150 controls a display state of the image data displayed to the display unit 160. The display controller 150 controls the display state based on the operation input received by the operation receiving unit 110, the display state maintained by the display-state maintaining unit 140, the image data held by the image database 120, and the link managed by the link management database. As a result, the display state maintained by the display-state maintaining unit 140 is updated. The display controller 150 updates the link management database 130 in response to the operation input received by the operation receiving unit 110.

The display unit 160 serves to display a display image, such as image data, etc., in accordance with control from the display controller 150. The display unit 160 is realized by a Liquid Crystal Display (LCD), etc., for example.

Figure 2:
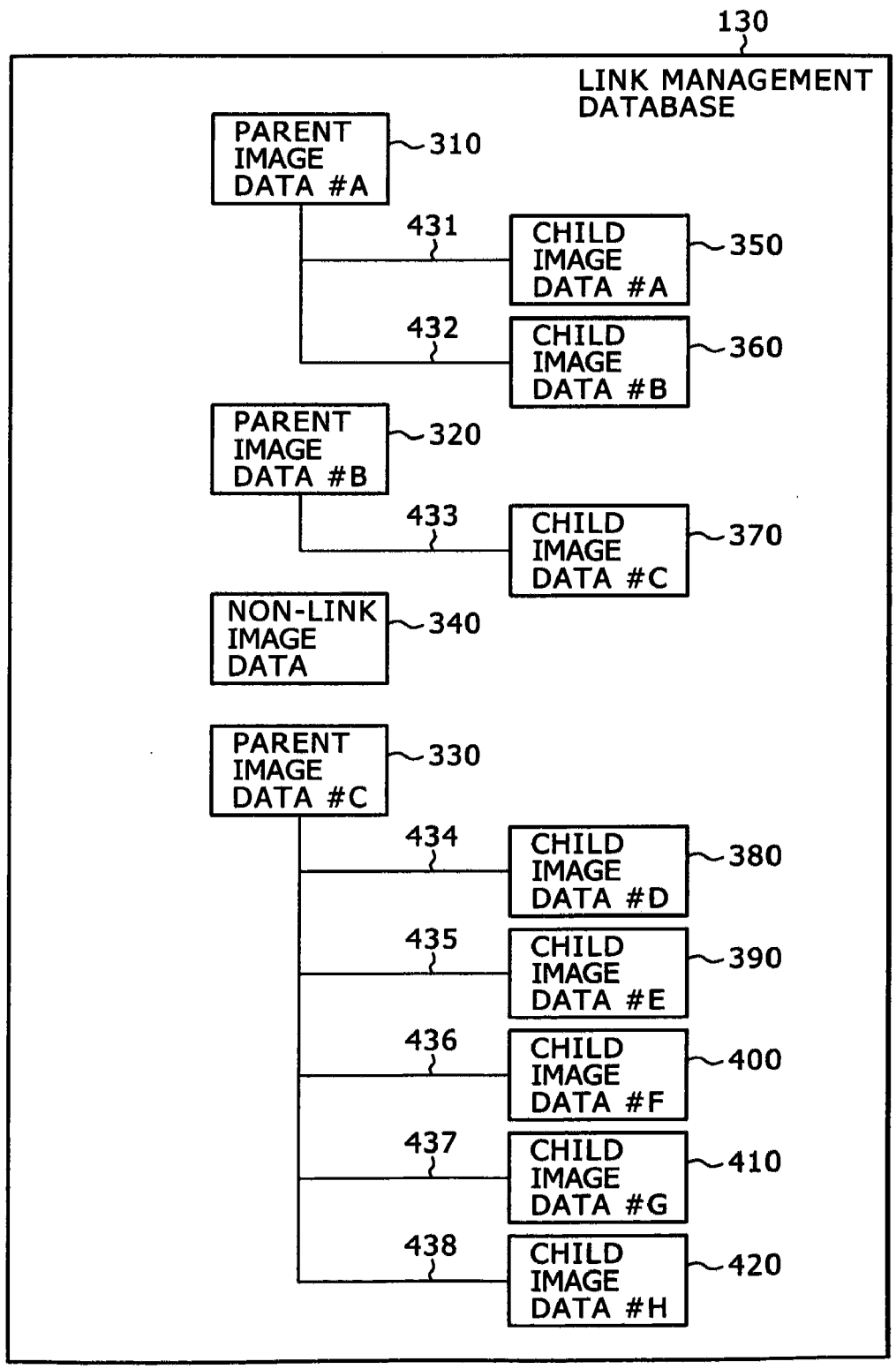
FIG. 2 is a diagram showing one example of a data structure of a link management database 130 in the embodiment of the present invention.

FIG. 2 is a diagram showing one example of a data structure of the link management database 130 in the embodiment of the present invention. The link management database 130 manages information about a link representing a parent-child relationship between the image data. In FIG. 2, each of parent image data #A to #C (310 to 330), non-linked image data 340, and child image data #A to #H (350 to 420) corresponds to image data in the image database 120, and is provided with a pointer. Links 431 to 437 represent a parent-child relation between the image data. In FIG. 2, the parent image data #A to #C (310 to 330) has links (431 to 438) with any of the child image data #A to #H (350 to 420).

The parent image data #A (310) has links with the child image data #A and #B (350 and 360). The parent image data #B (320) has a link with the child image data #C (370). The parent image data #C (330) has links with the child image data #D to #H (380 to 420). The non-linked image data 340 is image data having no link. In this manner, the link management database 130 manages links showing the parent-child relationship between the image data, as a database.

The links managed by the link management database 130 are updated based on operation input relating to setting or canceling of links received by the operation receiving unit 110. For example, when operation input in which parent image data of the child image data #A (350) is changed to the parent image data #B (320) is performed, the link 431 between the child image data #A (350) and the parent image data #A (310) is canceled, and a new link is set between the child image data #A (350) and the parent image data #B (320), as the child image data #C (370) has a link with the parent image data #B (320).

Figure 3:
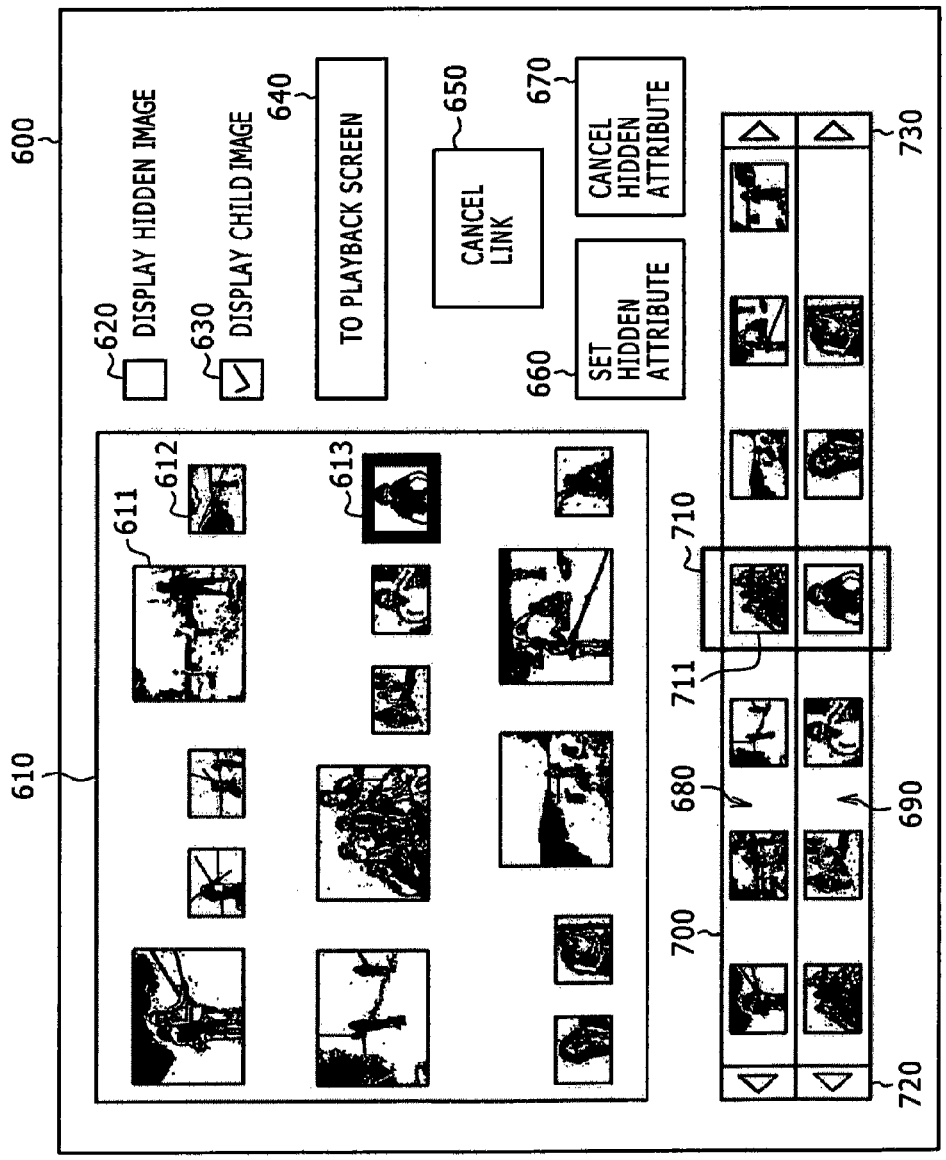
FIG. 3 is a diagram showing an example of a display screen 600 displayed on a display unit 160 when display images in an image-data display area 610 are a whole display in the embodiment of the present invention.

FIG. 3 is a diagram showing an example of the display screen 600 displayed to the display unit 160 in the embodiment of the present invention.

In an image-data display area 610 positioned at an upper left area of the display screen 600, the image data is displayed according to either one of an "index display mode" in which a plurality of image data is displayed in reduced size (thumbnails) or a "playback display mode" in which one image data is displayed in a whole area of the image-data display area 610. A display by the index display mode is referred to as an index display, and a display by the playback display mode is referred to as a playback display. In the index display mode, an image frame 613 indicating selected image data out of the plurality of image data is shown.

Display modes in the index display mode include a "whole display" in which all image data is subject to be displayed and a "digest display" in which the child-image data is not subject to be displayed. FIG. 3 shows a display mode of the whole display in the index display mode. In the case of the whole display, child image data 612 is arranged behind parent image data 611, and displayed to be smaller than the parent image data 611.

In an upper right area of the display screen 600, a hidden-image display checkbox 620, a child-image display checkbox 630, and a display switch button 640 are displayed.

The hidden-image display checkbox 620 is a checkbox indicating whether image data to which a hidden image attribute is set is displayed in the image-data display area 610. Herein, the hidden image attribute is an attribute belonging to the image data for preventing a display of the image data. When the hidden image attribute is utilized, a display of image data which should not viewed by others may be prevented. In FIG. 3, since there is no checkmark in the checkbox of the hidden-image display checkbox 620, the image data to which the hidden image attribute is set is not displayed in the image-data display area 610. As described later (FIG. 6), when there is the checkmark in the checkbox of the hidden-image display checkbox 620, the image data to which the hidden image attribute is set is also displayed. The presence of the checkmark and the absence thereof in the checkbox of the hidden-image display checkbox 620 are switched when clicked by an inputting device, such as a mouse, a touch panel, etc. Thus, a user may be able to switch whether to display the image data to which the hidden image attribute is set by clicking the hidden-image display checkbox 620.

The child-image display checkbox 630 is a checkbox indicating whether the child image data is displayed in the digest display. In FIG. 3, since there is a checkmark in the checkbox of the child-image display checkbox 630, all image data are displayed in the image-data display area 610. As described later (FIG. 5), when there is no checkmark in the checkbox of the child-image display checkbox 630, image data other than the child image data is displayed in the image-data display area 610. The presence of the checkmark and the absence thereof in the checkbox of the child-image display checkbox 630 are switched when clicked by an inputting device, such as a mouse, a touch panel, etc. Thus, the user may be able to switch between the whole display and the digest display by clicking the child-image display checkbox 630.

The display switch button 640 serves to switch between the index display in which a plurality of reduced size images are subject to be displayed in the image-data display area 610 and the playback display in which one image data is subject to be displayed. The index display and the digest display are designed to be switched one from the other when the display switch button 640 is clicked by an inputting device such as a mouse, a touch panel, etc. Further, the display switch button 640 displays a display mode switched by clicking the display switch button 640. The display switch button 640 in FIG. 3 displays "To playback screen", and this means that when the display switch button 640 is clicked, the display is switched to the playback display. It means that the current display in the image-data display area 610 is the index display. As described later (FIG. 5), when the display switch button 640 is clicked if "To index display screen" is displayed in the display switch button 640, this means that when the display switch button 640 is clicked, the display is switched to the index display, and a display in the image-data display area 610 at that time is the playback display.

On a right-hand area of the display screen 600, a link canceling area 650, a hidden-attribute setting area 660, and a hidden-attribute canceling area 670 are displayed.

The link canceling area 650 is an area for canceling a link showing the parent-child relationship of the image data. Canceling of the link is performed by placing an icon of any image data displayed on the display screen 600 over the link canceling area 650. As a result, a link to the image data in the parent-child relationship with the placed-over image data is deleted from the link management database 130. Therefore, the placed-over image data and the image data in the parent-child relationship with the image data are managed by the link management database 130 as image data without a link (non-link image data). In particular, in the case where the placed-over image data is the parent image data, all links of the parent-image data and the child-image data thereof are cancelled.

The hidden-attribute setting area 660 and the hidden-attribute canceling area 670 are areas for setting and canceling the hidden image attribute to the image data, respectively. Setting or canceling of the hidden image attribute to the image data is performed by placing an icon of the image data displayed on the display screen 600 over the hidden-attribute setting area 660 or the hidden-attribute canceling area 670. That is, when the icon of the image data is placed over the hidden-attribute setting area 660, the hidden image attribute is set to the image data, and when the icon of the image data is placed over the hidden-attribute canceling area 670, the hidden image attribute of the image data is canceled.

In a lower area of the display screen 600, an image operation area 700 is displayed. The image operation area 700 serves to be area for operating the image data displayed in the image-data display area 610. The image operation area 700 includes a parent image area 680, a child image area 690, a selection frame 710, a left-arrow button 720, and a right-arrow button 730.

The parent image area 680 is an area where image data 711 which represents one or a plurality of image data to be displayed in the child image area 690 is displayed. At this time, in the parent image area 680, based on the link between the image data, the parent image data or the image data without a link are displayed. A display of the image data in the parent image area) 680 is moved by clicking the left-arrow button 720 or the right-arrow button 730 by an inputting device, such as a mouse, a touch panel, etc.

The selection frame 710 serves to select image data which are surrounded by the selection frame 710 as a result of the movement of the image data displayed in the parent image area 680 or the child image area 690.

The child image area 690 serves to display image data associated with the image data 711 surrounded by the selection frame 710 displayed in the parent image area 680. That is, in the child image area 690, when the image data 711 surrounded by the selection frame 710 is the parent image data, the parent image data and the child image data linked to the parent image data are displayed, and when the image data 711 surrounded by the selection frame 710 is the image data without a link, the image data without a link itself is displayed. A display of the image data in the child image area 690 is moved by clicking the left-arrow button 720 or the right-arrow button 730 by an inputting device, such as a mouse, a touch panel, etc.

At this time, in the case of the digest display, image data which is surrounded by the selection frame 710 to be displayed in the parent image area 680 is selected, and based on the selected image data, the image frame 613 is displayed around the corresponding image data. On the other hand, in the case of the whole display, image data which is surrounded by the selection frame 710 to be displayed in the child image area 690 is selected, and based on the selected image data, the image frame 613 is displayed around the corresponding image data. In the case of the playback display, image data which is surrounded by the selection frame 710 to be displayed in the child image area 690 is selected, and the selected image data only is displayed in the image-data display area 610.

The image frame 613 is also moved when the image data in the image-data display area 610 is operated by an inputting device, such as a mouse, etc. At this time, the image data surrounded by the selection frame 710 in the image-operation area 700 is changed based on the image data clicked at the image-data display area 610.

Figure 4:
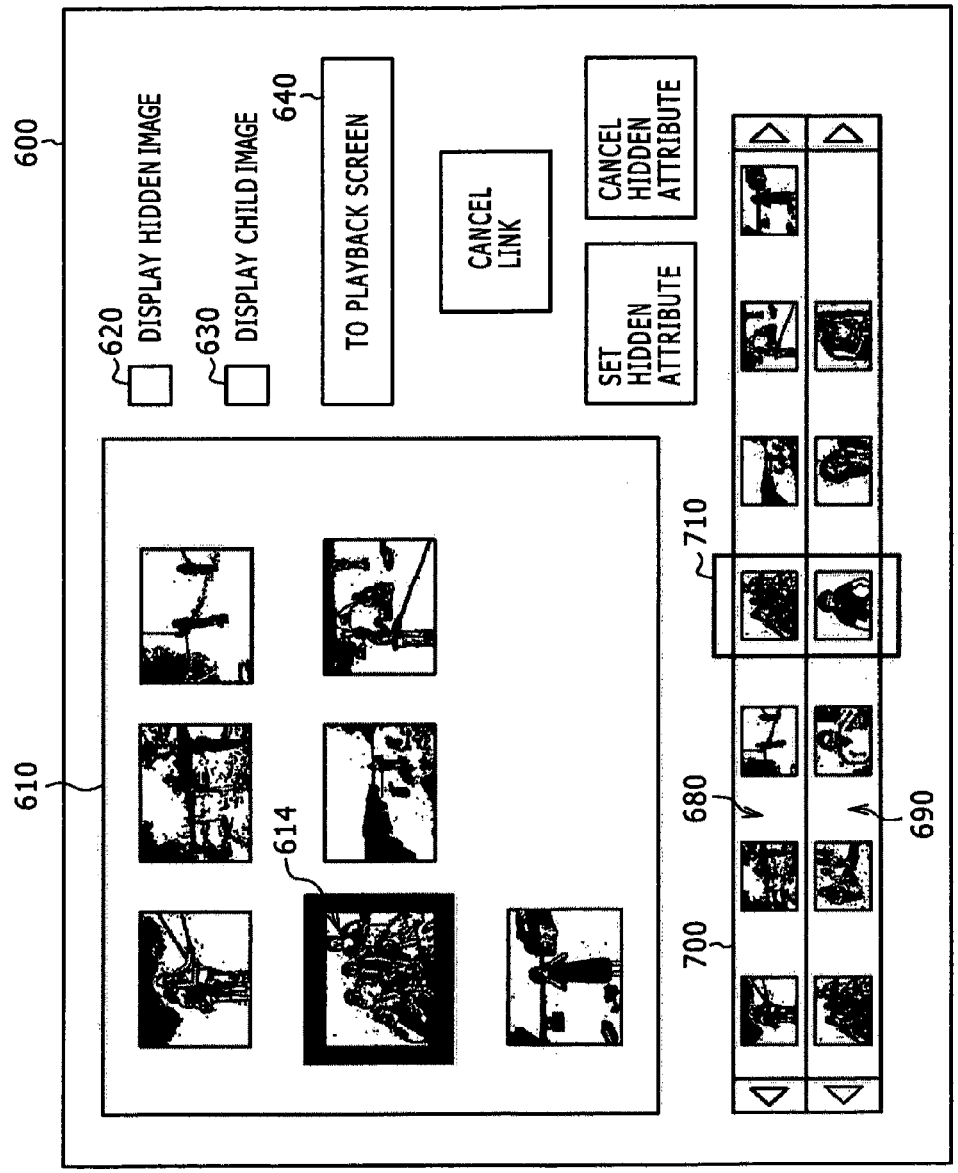
FIG. 4 is a diagram showing one example of the display screen 600 when display images in the image-data display area 610 are a digest display in the embodiment of the present invention.

FIG. 4 is a diagram showing one example of the display screen 600 when display images in the image-data display area 610 are in the digest display in the embodiment of the present invention. In FIG. 4, "To playback screen" is displayed in the display switch button 640, and it indicates that when the display switch button 640 is clicked, a display state in the image-data display area 610 is switched to the playback display. That means the display state displayed in the image-data display area 610 is the index display. In FIG. 4, there is no checkmark in the checkbox of the child-image display checkbox 630. That indicates the digest display in which image data other than the child-image data are subject to be displayed.

In this example, in the image-data display area 610, the parent image data and the non-link image data are displayed. At this time, when selected image data 614 is parent image data, the child image data of the parent image data is displayed in the child image area 690. This may enable a user to confirm in the child image area 690 the child image data associated with the image data 614 displayed in the image-data display area 610. When the parent image data displayed in the parent image area 680 is selected in the image operation area 700, the child image data linked to the parent image data is displayed in the child image area 690. The image data 614 displayed in the image-data display area 610 is displayed chronologically based on an imaged date and time held in the image database 120, for example.

Figure 5:
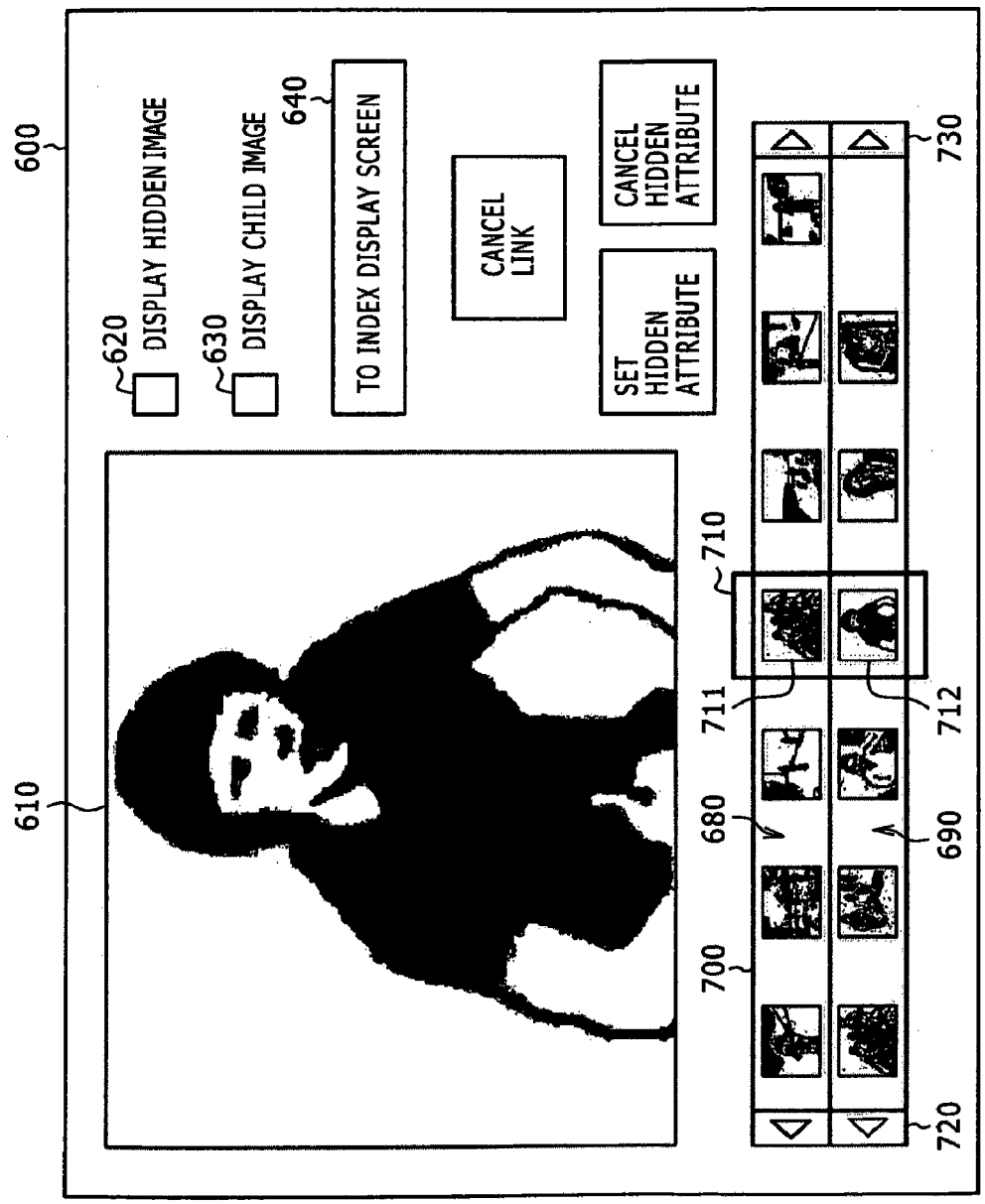
FIG. 5 is a diagram showing one example of the display screen 600 when display images in the image-data display area 610 are in a playback display in the embodiment of the present invention.

FIG. 5 is a diagram showing one example of the display screen 600 when display images in the image-data display area 610 are the playback display in the embodiment of the present invention. In FIG. 5, "To index display screen" is displayed in the display switch button 640. This display indicates that when the display switch button 640 is clicked, the display is switched to the index display. That is, it means that a display state in the image-data display area 610 is the playback display. In the playback display, no child image data is displayed in the image-data display area 610 irrespective of the presence of the checkmark of the child-image display checkbox 630.

In this example, only one image data is displayed in the image-data display area 610. In this case, the display controller 150 displays image data in the image-data display area 610 based on image data 712 surrounded by the selection frame 710 in the child image area 690. The image data 712 is changed by clicking the left-arrow button 720 and the right-arrow button 730, as described above.

Figure 6:
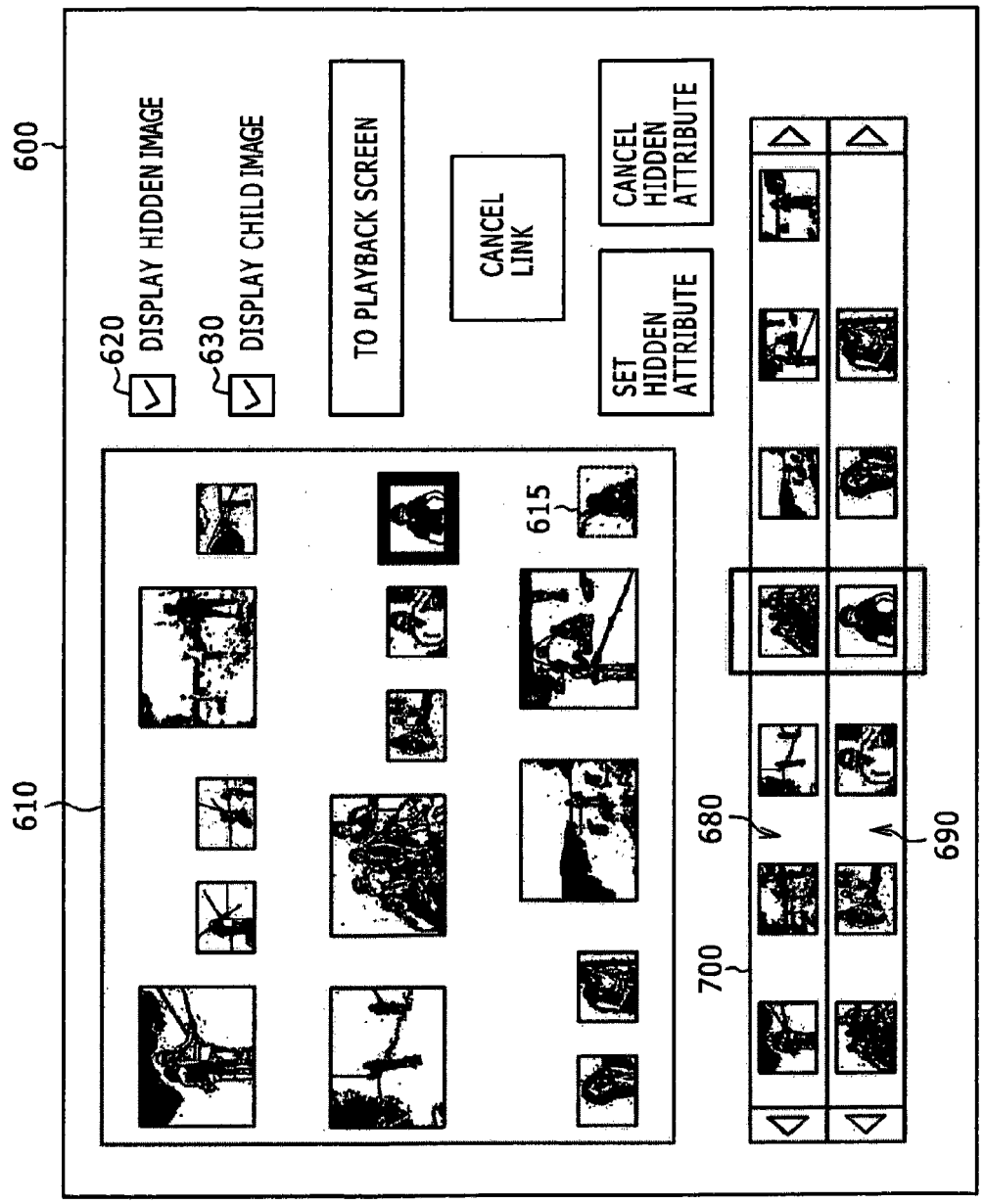
FIG. 6 is a diagram showing one example of the display screen 600 of image data to which a hidden image attribute is set in the embodiment of the present invention.

FIG. 6 is a diagram showing one example of the display screen 600 of the image data to which the hidden image attribute is set in the embodiment of the present invention. In FIG. 6, a checkmark is put to the checkbox of the hidden-image display checkbox 620. Thus, the image data to which the hidden image attribute is set is also displayed in the image-data display area 610. Further, also in the parent image area 680 and the child image area 690, the image data to which the hidden image attribute is set are displayed. Image data 615 to which the hidden image attribute is set may be displayed in a mode different from those of other image data. For example, the image data may be displayed translucently to indicate that the hidden image attribute is set. On the other hand, when no checkmark is put to the checkbox of the hidden-image display checkbox 620, the image data to which the hidden image attribute is set is not displayed in the image-data display area 610, the parent image area 680, and the child image area 690.

Figure 7:
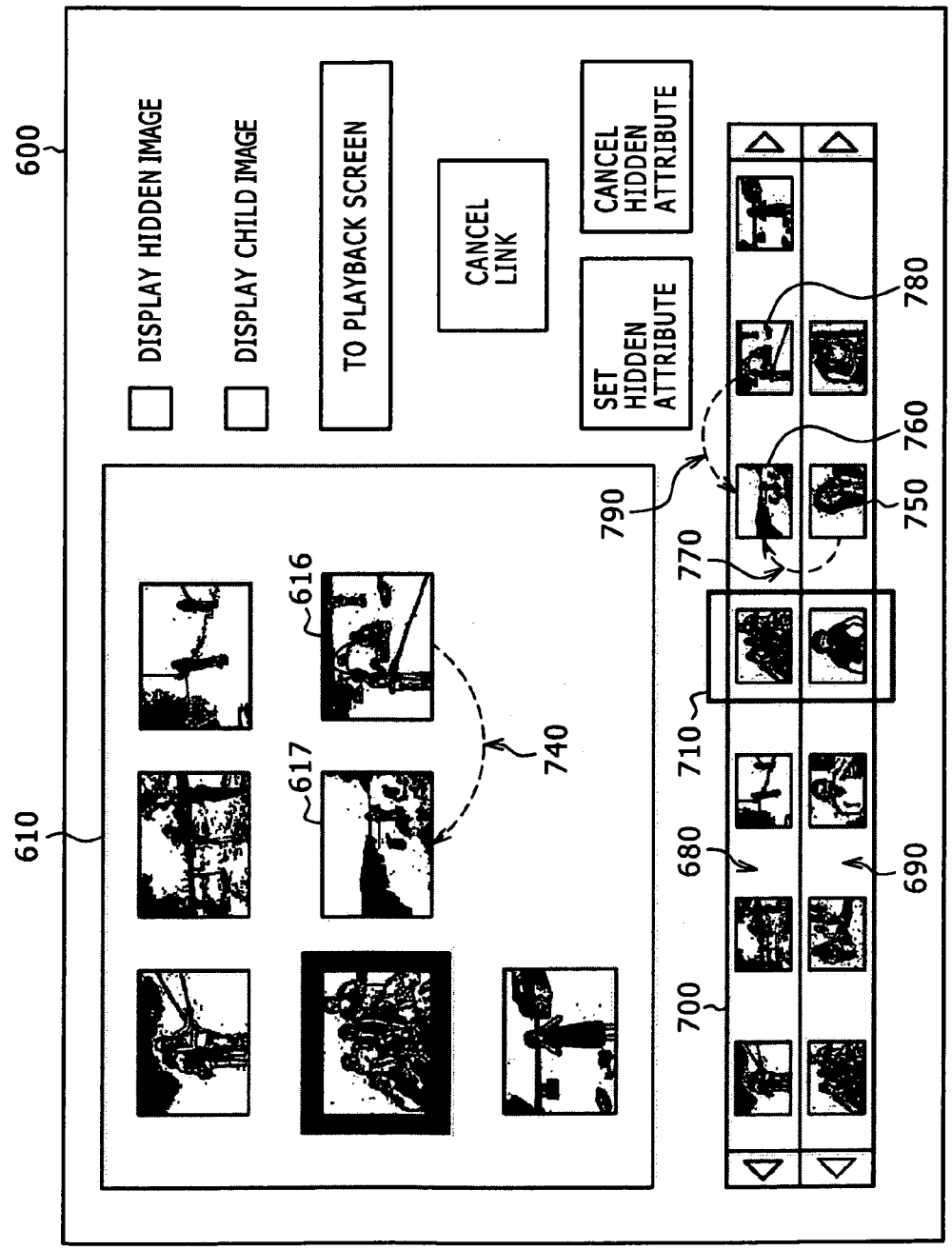
FIG. 7 is a diagram showing a method for setting a link to the image data in an index display mode in the embodiment of the present invention.

FIG. 7 is a diagram indicating a method for setting the link to the image data in the index display mode in the embodiment of the present invention.

As a first link setting method, a method where an image data 616 displayed in the image-data display area 610 is placed over another image data 617 (740) to set a new link is conceivable. That is, a method in which an icon of the image data 616 is placed over (dragged & dropped to) the image data 617 to input the parent-child relationship. As a result, when the image data 617 is the non-link image data or the parent image data, the image data 616 and the child image data thereof are managed by the link management database 130 as child image data of the image data 617. On the other hand, when the image data 617 is the child image data, the image data 616 and the child image data thereof are managed as child image data having the same parent image data as that of the image data 617.

As a second link setting method, it may be conceivable that image data 750 displayed in the child image area 690 is placed over image data 760 displayed in the parent image area 680 (770) to set a new link. As a result, the image data 750 is managed as child image data of the image data 760.

A third link setting method may include (790) placing image data 780 displayed in the parent image area 680 over the other image data 760 displayed in the parent image area 680 to set a new link. As a result, the image data 780 and the child image data thereof are adapted to be managed as the child image data of the image data 760.

Figure 8:
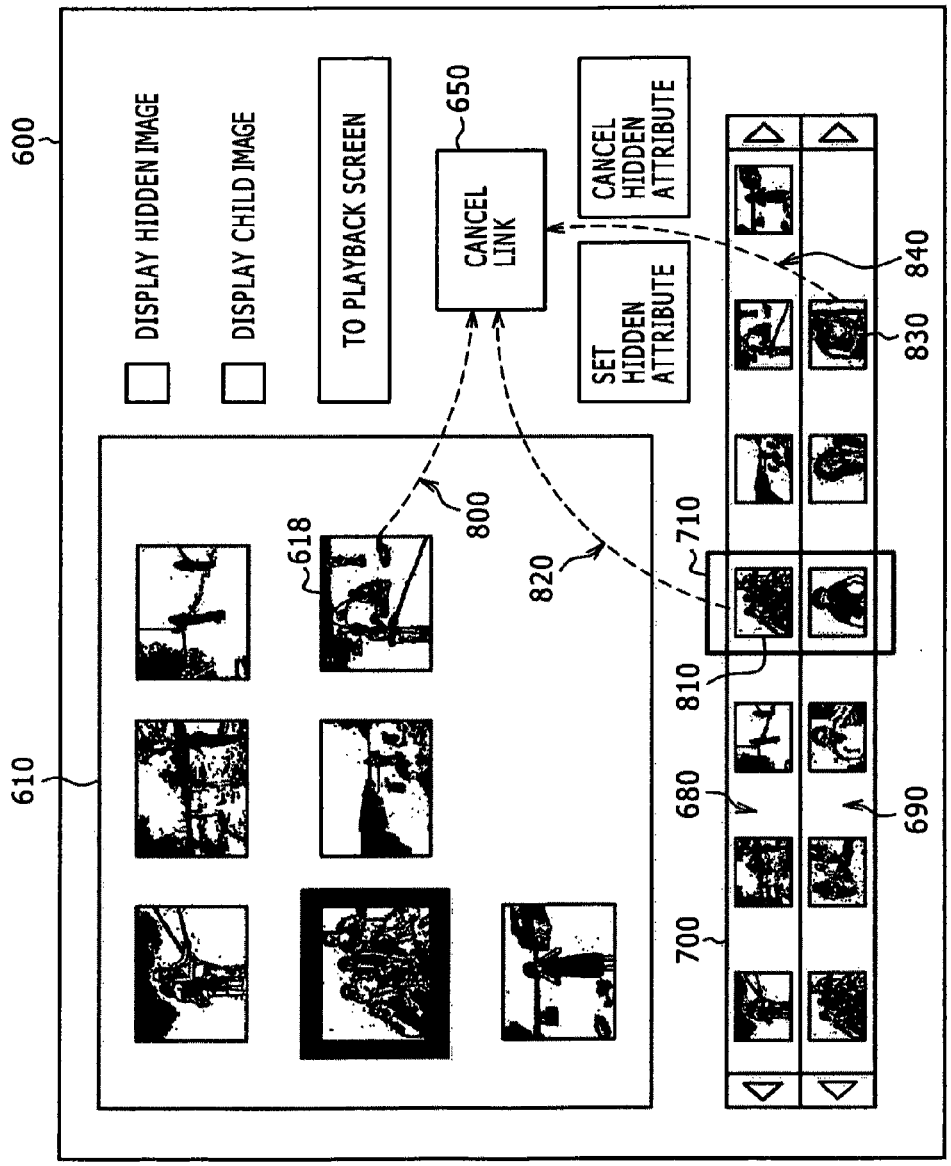
FIG. 8 is a diagram showing a method for canceling the link of the image data in the index display mode in the embodiment of the present invention.

FIG. 8 is a diagram showing a method for canceling the link to the image data in the index display mode in the embodiment of the present invention.

As a first link canceling method, it may conceivable that image data 618 displayed in the image-data display area 610 is placed over the link canceling area 650 (800) to cancel a link between the image data 618 and the child image data thereof. As a result, the image data 618 and the child image data thereof come to be managed as the non-link image data.

As a second link canceling method, it may conceivable that image data 810 displayed in the parent image data area 680 is placed over the link canceling area 650 (820) to cancel a link between the image data 810 and the child image data thereof. As a result, the image data 810 and the child image data thereof come to be managed as the non-link image data.

As a third link canceling method, it may conceivable that image data 830 displayed in the child image area 690 is placed over the link canceling area 650 (840) to cancel the link of the image data 830. As a result, the image data 830 is managed as the non-link image data.

Figure 9:
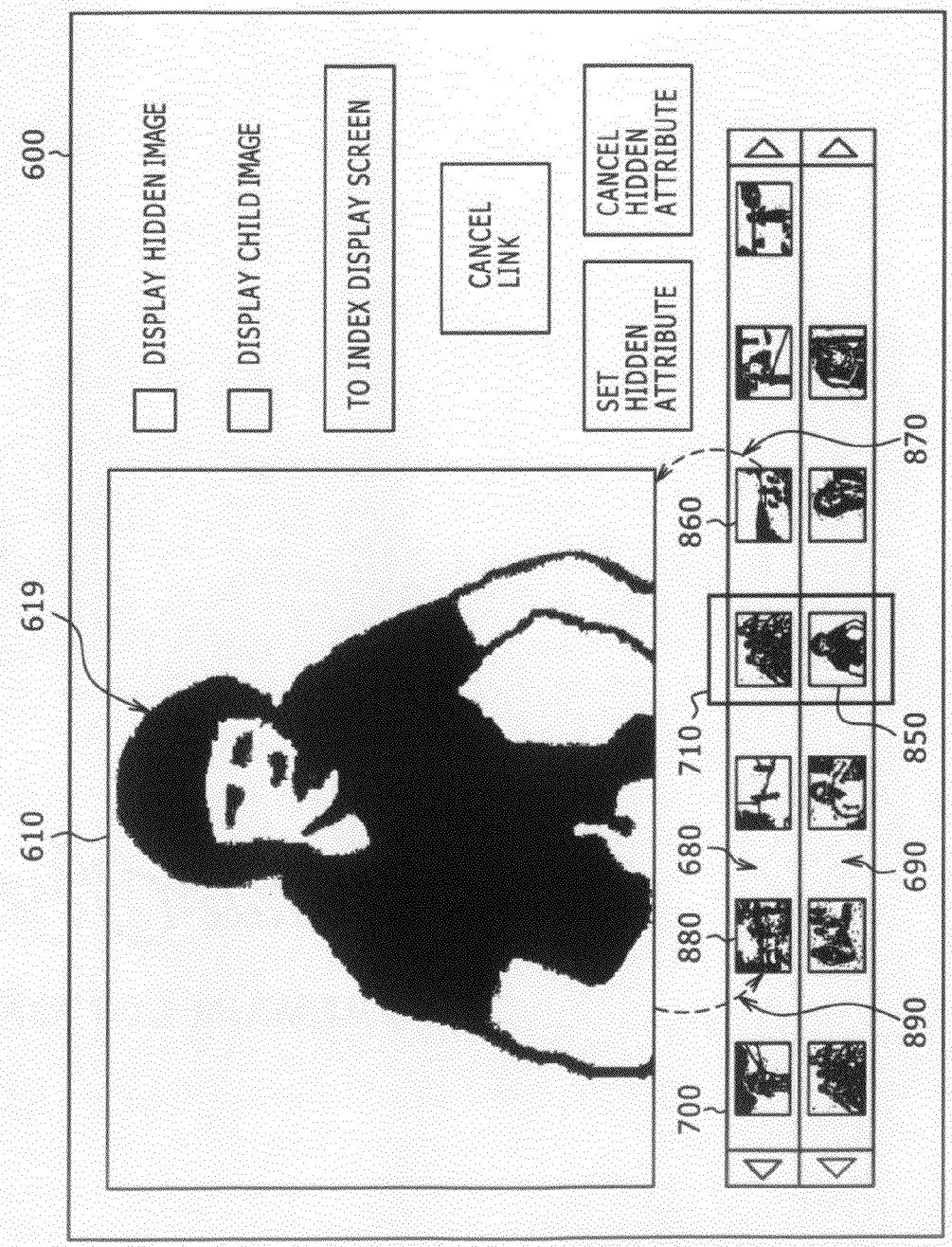
FIG. 9 is a diagram showing a method for setting a link to the image data in a playback display mode in the embodiment of the present invention.

FIG. 9 is a diagram showing a method for setting the link to the image data in the playback display mode in the embodiment of the present invention. In FIG. 9, in the image-data display area 610, image data 619 corresponding to image data 850 in the child image area 690 is displayed.

As a first link setting method, it may conceivable that image data 860 displayed in the parent image area 680 over image data 619 (870) to set a new link. As a result, when the image data 619 is the non-link image data or the parent image data, the image data 860 comes to be managed as child image data of the image data 619. On the other hand, when the image data 619 is the child image data, the image data 860 comes to be managed as child image data having the parent image data same with that of the image data 619.

As a second link setting method, it may conceivable that the image data 619 is placed over image data 880 displayed in the parent image area 680 (890) to set a new link. As a result, the image data 619 is managed as a child image of the image data 880.

Figure 10:
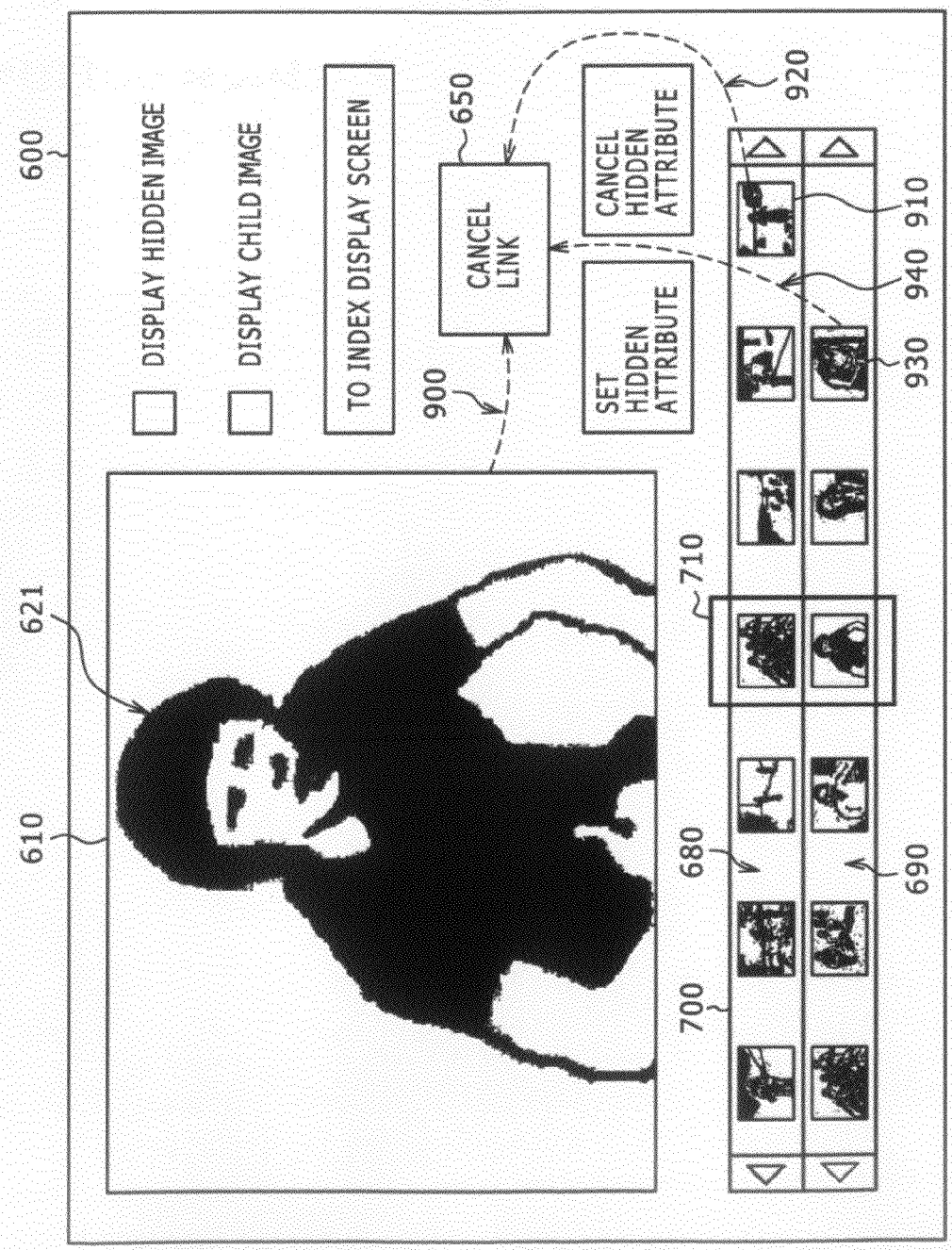
FIG. 10 is a diagram showing one example of a method for canceling the link of the image data in the playback display mode in the embodiment of the present invention.

FIG. 10 is a diagram showing one example of a method for canceling the link to the image data in the playback display mode in the embodiment of the present invention.

As a first link canceling method, it may conceivable that image data 621 displayed in the image-data display area 610 is placed over the link canceling area 650 (900) to cancel a link between the image data 621 and the child image data thereof. As a result, the image data 621 and the child image data thereof are managed as the non-link image data.

As a second link canceling method, it may conceivable that image data 910 displayed in the parent image area 680 is placed over the link canceling area 650 (920) to cancel a link between the image data 910 and the child image data thereof. As a result, the image data 910 and the child image data thereof are managed as the non-link image data.

A third link canceling method may include (940) placing image data 930 displayed in the child image area 690 over the link canceling area 650 to cancel the link of the image data 930. As a result, the image data 930 is managed as the non-link image data.

Figure 11:
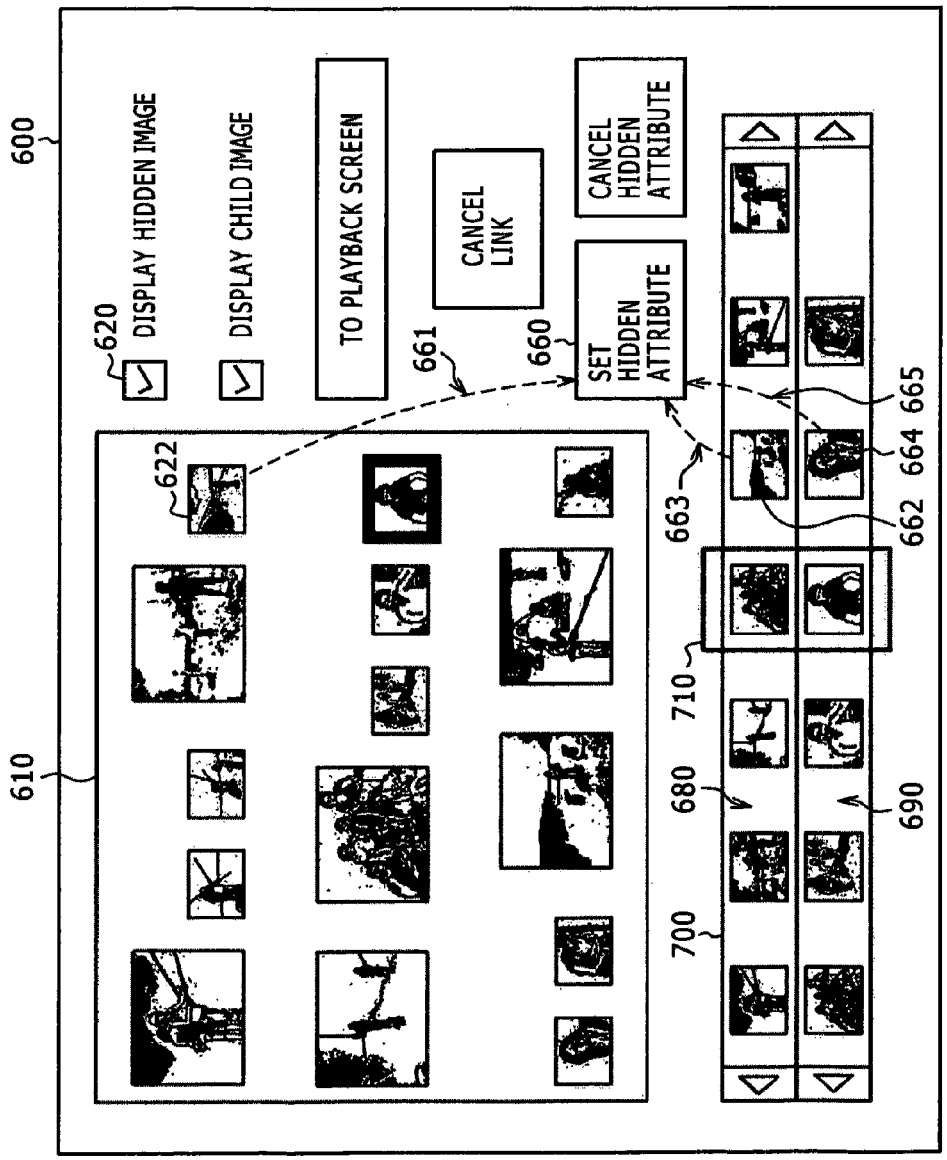
FIG. 11 is a diagram showing method for setting the hidden image attribute in the embodiment of the present invention.

FIG. 11 is a diagram showing a method for setting the hidden image attribute in the embodiment of the present invention.

As a first method for setting the hidden image attribute, it may conceivable that image data 622 displayed in the image-data display area 610 is placed over the hidden-attribute setting area 660 (661) to set a hidden image attribute to the image data 622. When the image data 622 is the parent image data, the hidden image attribute is set to the image data 622 and the child image data thereof.

As a second method for setting the hidden image attribute, it may conceivable that the image data 662 displayed in the parent image area 680 is placed over the hidden-attribute setting area 660 (663) to set the hidden image attribute to the image data 662 and the child image data thereof.

As a third method for setting the hidden image attribute, it may conceivable that image data 664 displayed in the child image area 690 is placed over the hidden-attribute setting area 660 (665) to set the hidden image attribute to the image data 664.

Figure 12:
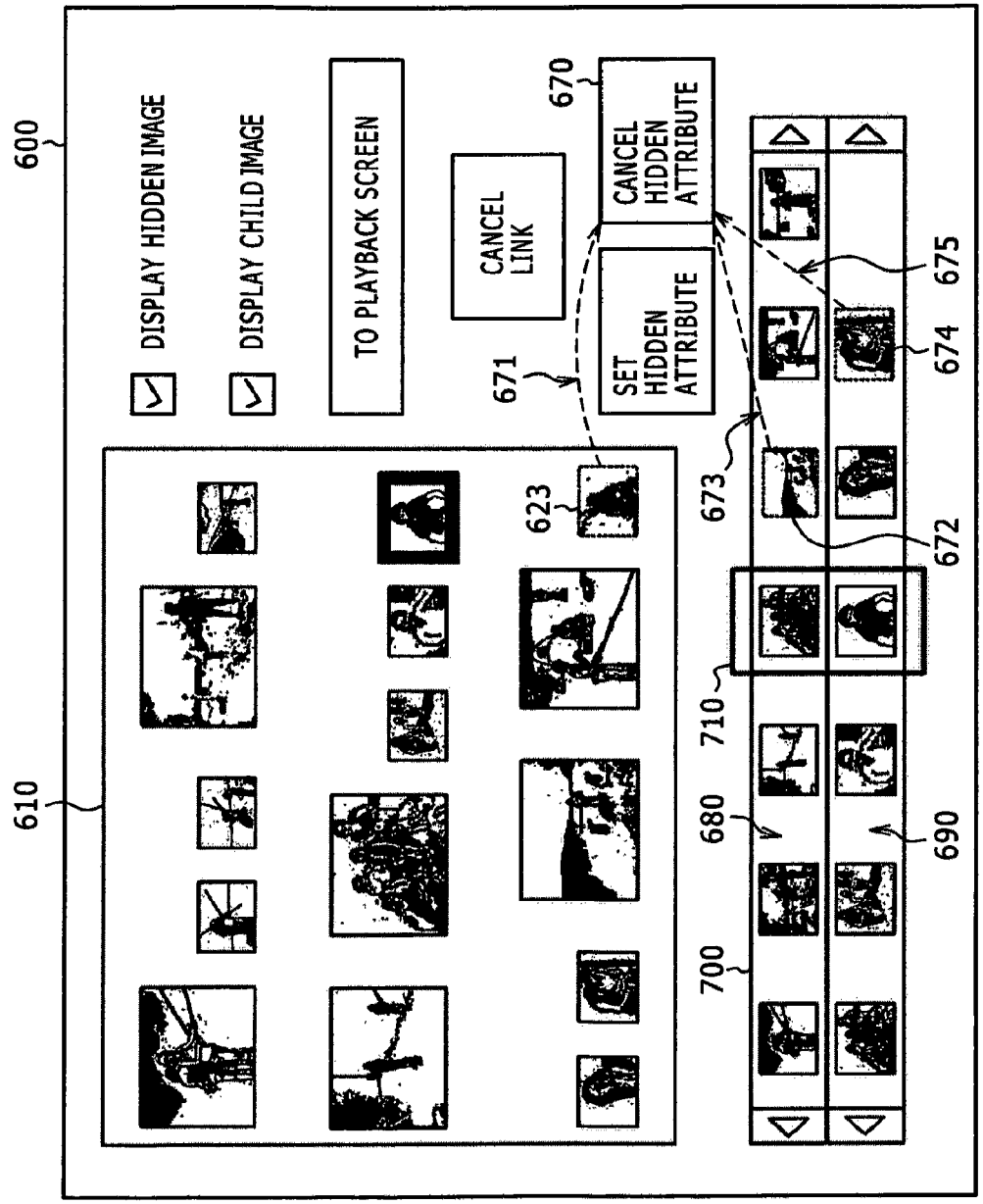
FIG. 12 is a diagram showing method for canceling the hidden image attribute in the embodiment of the present invention.

FIG. 12 is a diagram showing a method for canceling the hidden image attribute in the embodiment of the present invention.

As a first method for canceling the hidden image attribute, it may conceivable that image data 623 displayed in the image-data display area 610 is placed over the hidden-attribute canceling area 670 (671) to cancel a hidden image attribute of the image data 623. When the image data 623 is the parent image data, hidden image attributes of the image data 623 and the image data thereof are canceled.

As a second method for canceling the hidden image attribute, it may conceivable that image data 672 displayed in the parent image area 680 is placed over the hidden-attribute canceling area 670 (673) to cancel a hidden image attribute of the image data 673 and the child image data thereof.

As a third method for canceling the hidden image attribute, it may conceivable that image data 674 displayed in the child image area 690 is placed over the hidden-attribute canceling area 670 (675) to cancel a hidden image attribute of the image data 674.

Figure 13:
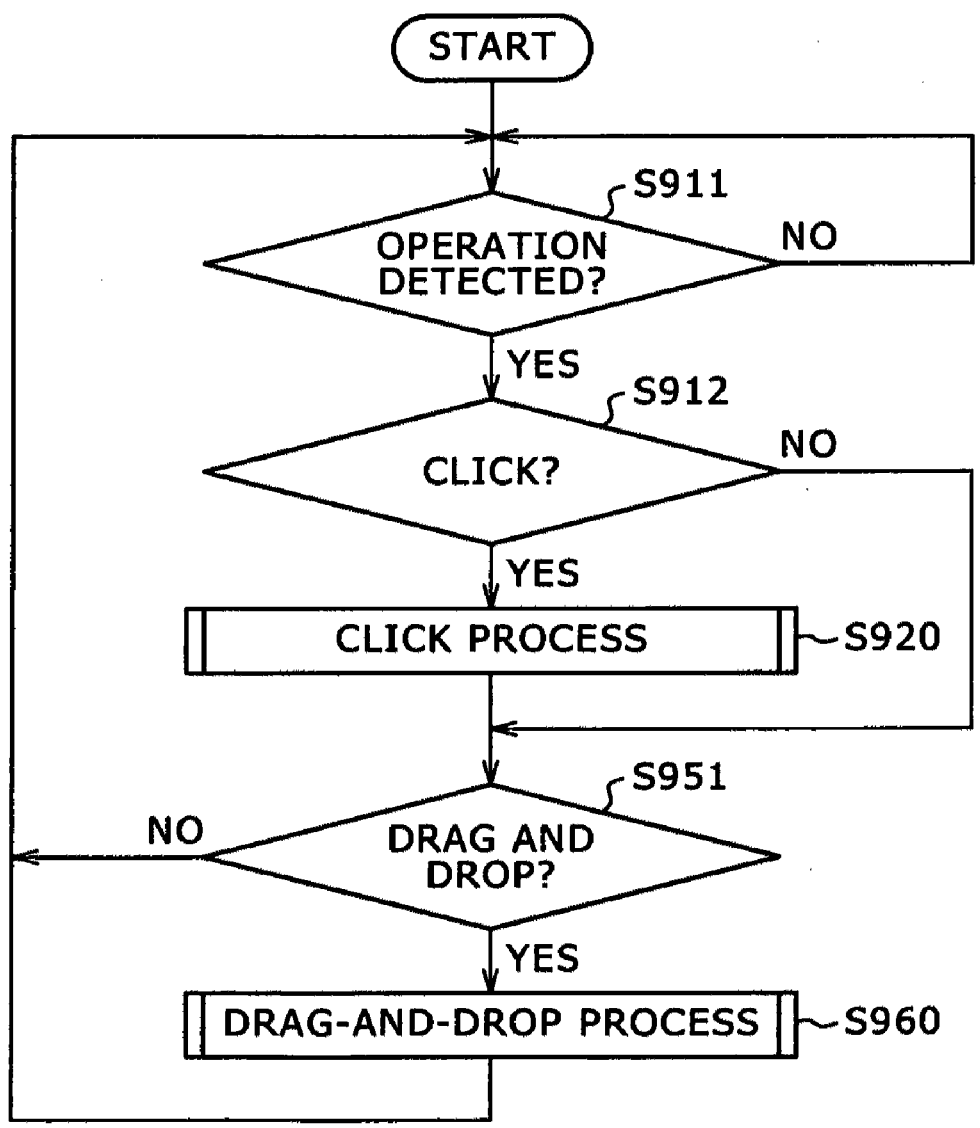
FIG. 13 is a flowchart showing an example of procedures of the image display controlling apparatus 100 according to the embodiment of the present invention.

FIG. 13 is a flowchart showing an example of procedures of the image display controlling apparatus 100 according to the embodiment of the present invention.

Firstly, it is determined in the operation receiving unit 110 whether operation input is detected or not (step S911). At this time, when the operation input is not detected, the process waits until the operation input is detected.

On the other hand, when the operation input is detected, it is determined whether the operation input is a click operation (step S912). At this time, when the operation input detected at the step S911 is the click operation (step S912), a click process is performed (step S920).

On the other hand, when the operation input detected at the step S911 is not the click operation (step S912), it is determined whether the operation input detected at the step S911 is a drag-and-drop operation of an icon showing the image data (step S951). When the operation input detected at the step S911 is the drag-and-drop operation of the icon showing the image data (step S951), the drag-and-drop process is performed (step S960).

On the other hand, when the operation input detected at the step S911 is not the drag-and-drop operation of the icon showing the image data (step S951), the process advances to the step S911 to repeat the operations.

Figure 14:
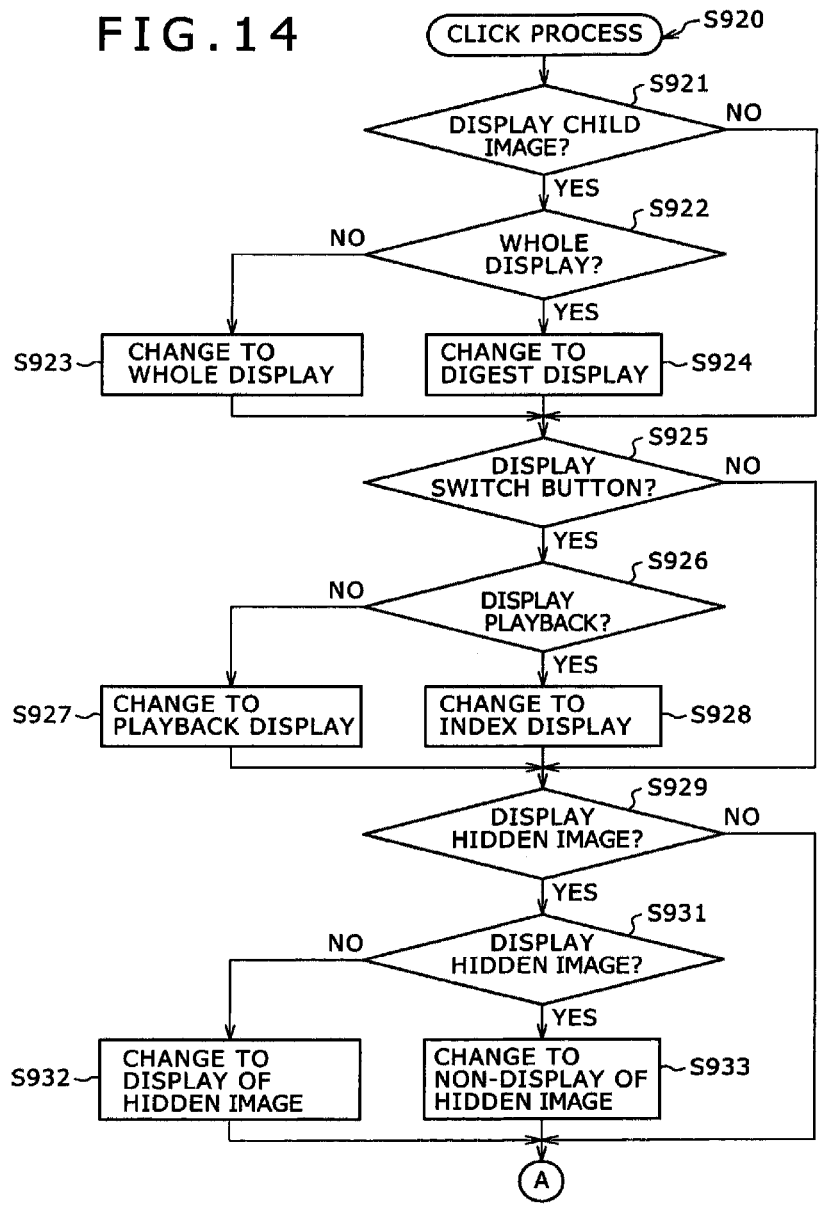
FIG. 14 is a flowchart showing a first half of an example of procedures of a click process (step S920) in the embodiment of the present invention.

FIG. 14 is a flowchart showing a first half of procedure examples of the click process (step S920) in the embodiment of the present invention.

Firstly, when a location clicked at the step S911 is the child-image display checkbox 630 (step S921), it is determined whether a display mode is the whole display in which all image data are displayed (step S922). As a result, when the display mode is not the whole display, the display mode is changed to the whole display (step S923). On the other hand, when the display mode is the whole display, the display mode is changed to the digest display in which the image data other than the child image data are displayed in the image-data display area 610 (step S924).

Subsequently, when the location clicked at the step S911 is the display switch button 640 (step S925), it is determined whether the display mode is the playback display in which only one image data is displayed in the image-data display area 610 (step S926). As a result, when the display mode is not the playback display, the display mode is changed to the playback display (step S927). On the other hand, when the display mode is the playback display, the display mode is changed to the index display in which a plurality of image data is displayed in the image-data display area 610 (step S928).

Subsequently, when the location clicked at the step S911 is the hidden-image display checkbox 620 (step S929), it is determined whether a display state is a state where the image data to which the hidden image attribute is set is displayed in the image-data display area 610 (step S931). As a result, when the display state is a state where the hidden image is not displayed, the current state is changed to a state where a hidden image is displayed (step S932). On the other hand, when the display state is a state where the hidden image is displayed, the display state is changed to a state where the hidden image is not displayed (step S933).

Figure 15:
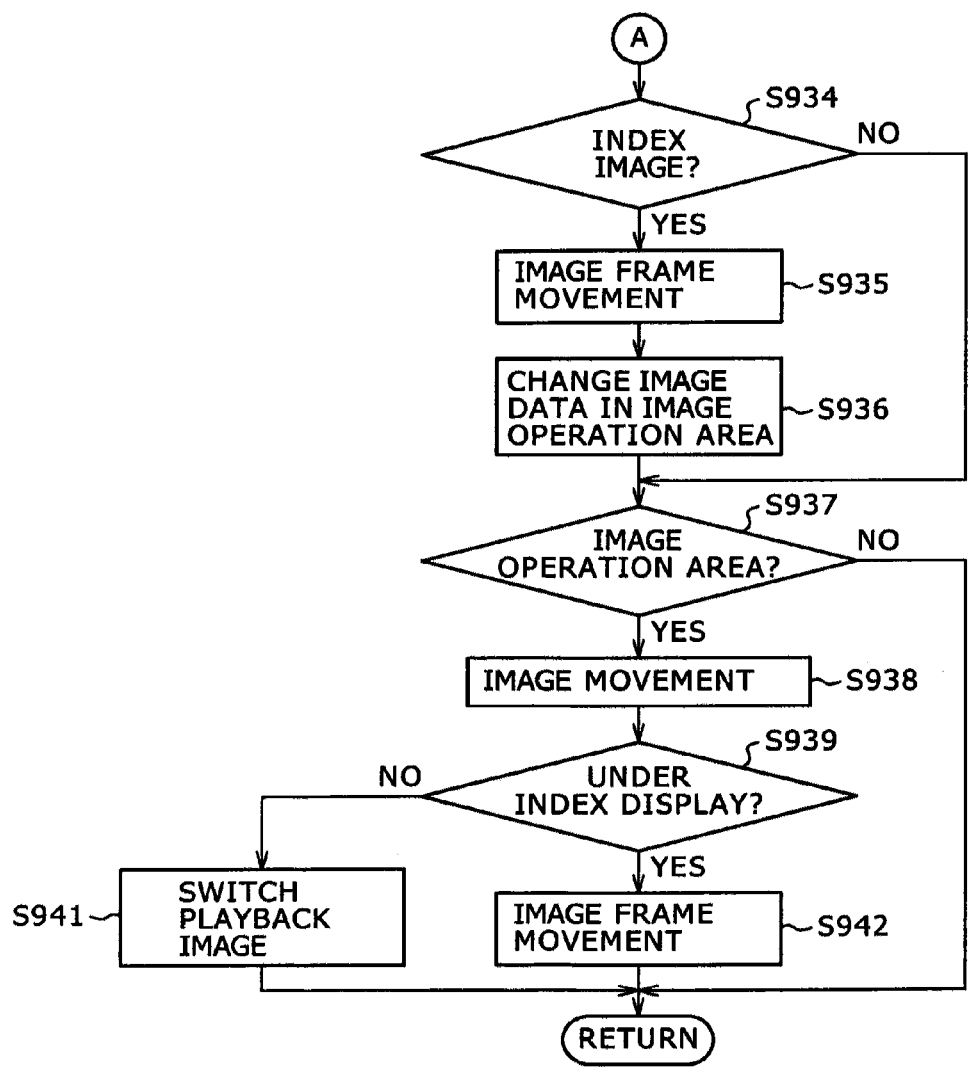
FIG. 15 is a flowchart showing a latter half of the example of procedures of the click process (step S920) in the embodiment of the present invention.

FIG. 15 is a flowchart showing a second half of the example of the procedure of the click process (step S920) in the embodiment of the present invention.

Firstly, when the location clicked at the step S911 is the image data displayed by the index display (step S934), the image frame 613 moves to the clicked image data to select the image data (step S935). The image data selected in the image operation area 700 is changed based on the movement of the image frame 613 (step S936).

Subsequently, when the location clicked at the step S911 is the left-arrow button 720 or the right-arrow button 730 in the image operation area 700 (step S937), an image to be selected in the image operation area 700 is changed (step S938). It is then determined whether the display state of the image-data display area 610 is the index display mode or not (step S939). As a result, when the display state is not the index display mode, the image data of the image-data display area 610 is displayed by the playback display mode. Thus, the image data displayed by the playback display is switched to another image data (step S941). On the other hand, when the display state is the index display mode, the image frame 613 of the image-data display area 610 moves to the image data selected at the step S938 (step S942).

Figure 16:
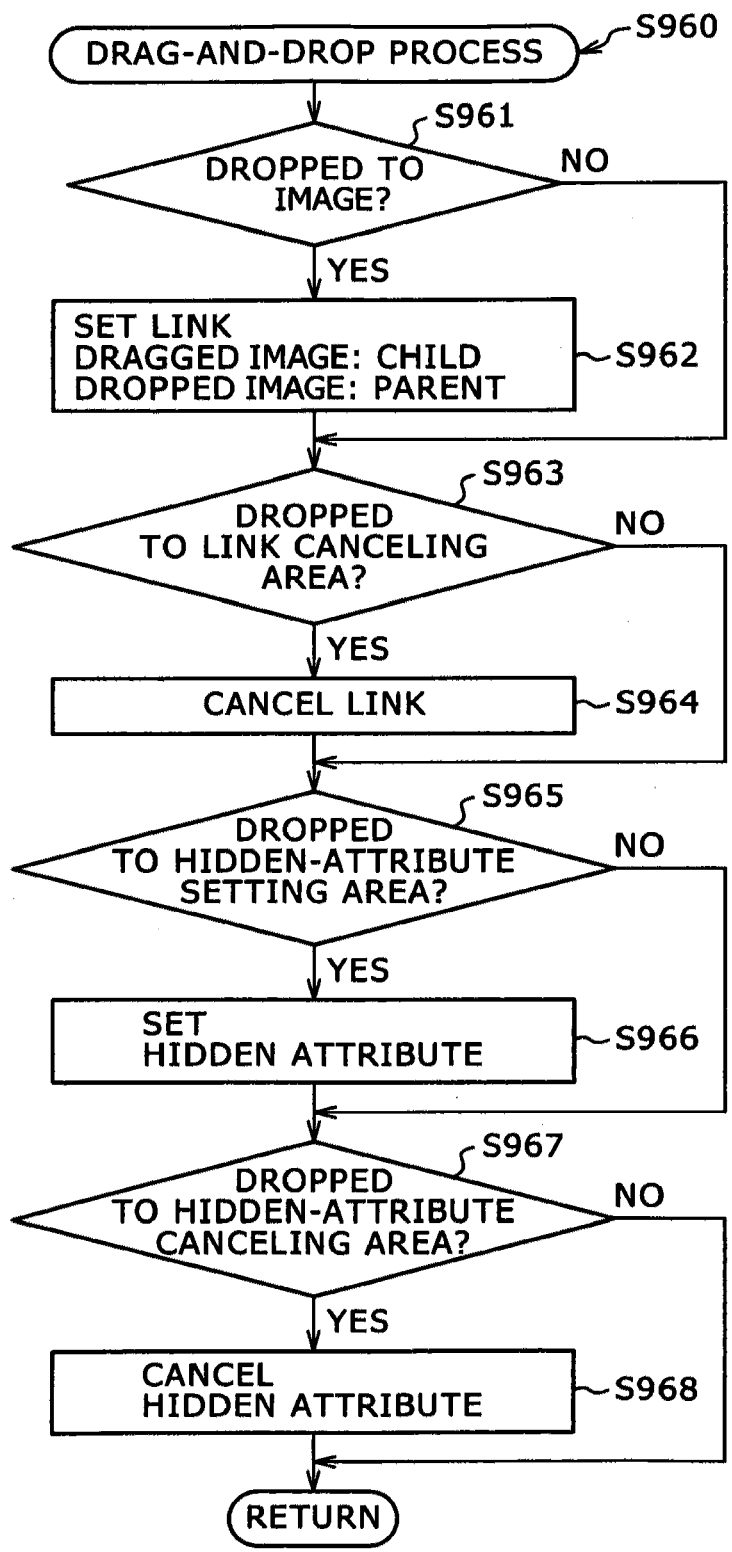
FIG. 16 is a flowchart showing an example of procedures of a drag-and-drop process (step S960) in the embodiment of the present invention.

FIG. 16 is a flowchart showing an example of procedures of the drag-and-drop process (step S960) in the embodiment of the present invention.

Firstly, it is determined whether a location (dropped location) at which the click is canceled is the image data or not (step S961). As a result, when the dropped location is the image data, a link is set such that dragged image data is the child image data and image data at the dropped location is the parent image data (step S962).

Subsequently, it is determined whether the dropped location is the link canceling area 650 (step S963). As a result, when the dropped location is the link canceling area 650, a link of the dragged image data is canceled (step S964).

Next, it is determined whether the dropped location is the hidden-attribute setting area 660 (step S965). As a result, when the dropped location is the hidden-attribute setting area 660, the hidden image attribute is set to the dragged image data (step S966).

Further next, it is determined whether the dropped location is the hidden-attribute canceling area 670 or not (step S967). As a result, when the dropped location is the hidden-attribute canceling area 670, the hidden image attribute of the dragged image data is canceled (step S968).

In this manner, according to the embodiment of the present invention, the link showing the association among the plurality of image data is managed by the link-management database 130. Based on the link, the display state may be switched either to the digest display or the whole display to enable easy viewing of the plurality of relevant image data. The link may be flexibly changed by simple operation input, such as a drag-and-drop or the like in the display screen 600.

In the embodiment of the present invention, the parent-child relationship is used to describe the association between the image data, but the association is not limited thereto. For example, grandchild image data dependent on the child image data may be subject to display in the image-data display area by adding a grandchild data area corresponding to the grandchild image data to the image operation area 700 and adding a link relating to the grandchild image data to the link management database 130.

Further, in the embodiment of the present invention, the link showing the association is set based on the image data unit basis. However, as described in a modified example described below, a link showing an association between a location (coordinates) within the image data and another image data may be set.

Figure 17A:
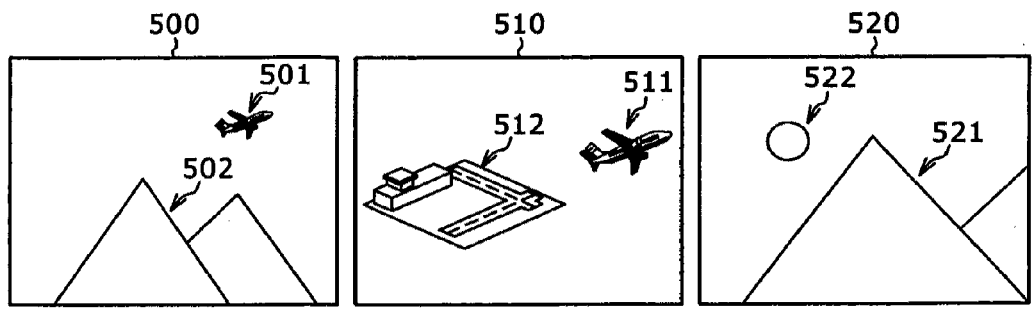
FIGS. 17A, 17B, and 17C are diagrams each showing an example of setting a link of image data in a modified example of the embodiment of the present invention.
Figure 17B:
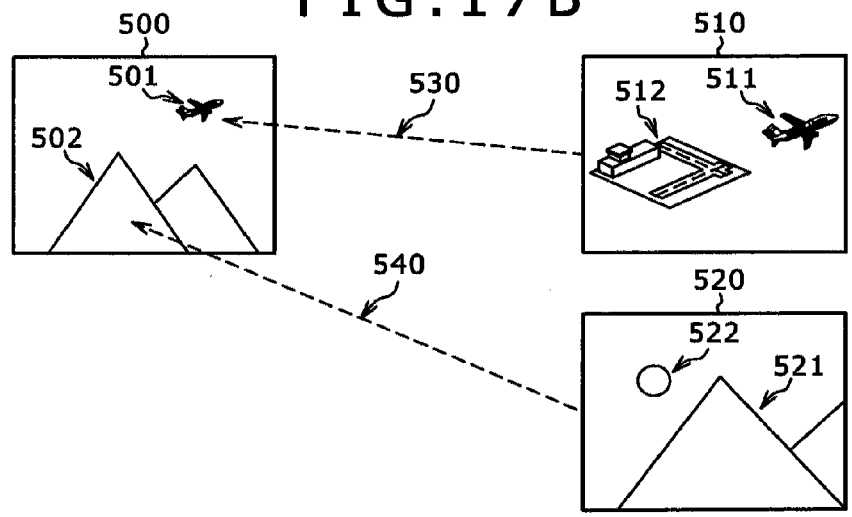
Figure 17C:
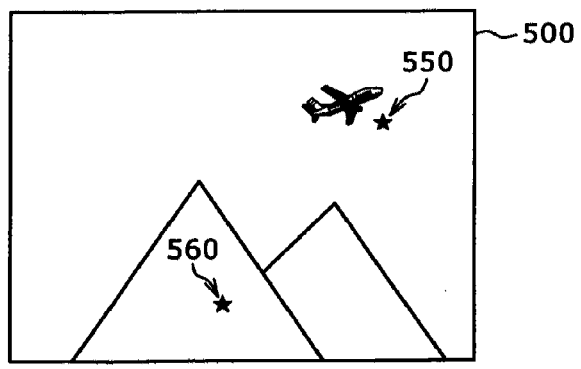

FIGS. 17A, 17B, and 17C are diagrams each showing an example of setting a link of the image data in the modified example of the embodiment of the present invention.

FIG. 17A shows a display image of image data to which the link is set. First image data 500 is image data of an imaged image in which an airplane 501 and a mountain 502 are objects. In the modified example, it is assumed that the first image data 500 is the parent image data. Second image data 510 is image data of an imaged image in which an airplane 511 and an airport 512 are objects. In the modified example of the embodiment of the present invention, it is assumed that the second image data 510 is child image data associated with the airplane 501 of the first image data 500. Third image data 520 is image data of an imaged image in which a mountain 521 and a moon 522 are objects. In the modified example of the embodiment of the present invention, it is assumed that the third image data 520 is child image data associated with the mountain 502 of the first image data 500. The first image data 500, the second image data 510, and the third image data 520 are held by the image database 120.

FIG. 17B shows a link setting operation of the image data. FIG. 17B shows a state (530) where an icon of the second image data 510 is dragged and dropped to be placed over a location of the airplane 501 in the first image data 500, and whereby, the display controller 150 obtains coordinates of the location (dropped location) where the click is canceled. Based on the obtained coordinates, the display controller 150 generates a link between the dropped location in the first image data 500 and the second image data 510. The link is saved in the link management database 130 according to control of the display controller 150.

FIG. 17B further shows a state (540) where an icon of the third image data 520 is placed over a location of the mountain 502 in the first image data 500, and whereby the display controller 150 obtains coordinates of the dropped location. Based on the obtained coordinates, the display controller 150 generates a link between the dropped location in the first image data 500 and the third image data 520. The link is saved in the link management database 130 according to control of the display controller 150.

FIG. 17C shows the first image data 500 after the link is set. In FIG. 17C, a first button 550 and a second button 560 are embedded in the first image data 500. The first button 550 corresponds to the dropped location of the second image data 510. The second button 560 corresponds to the dropped location of the third image data 520. Information about coordinates of the first and second buttons (550 and 560) is held in the link management database 130.

Figure 18:
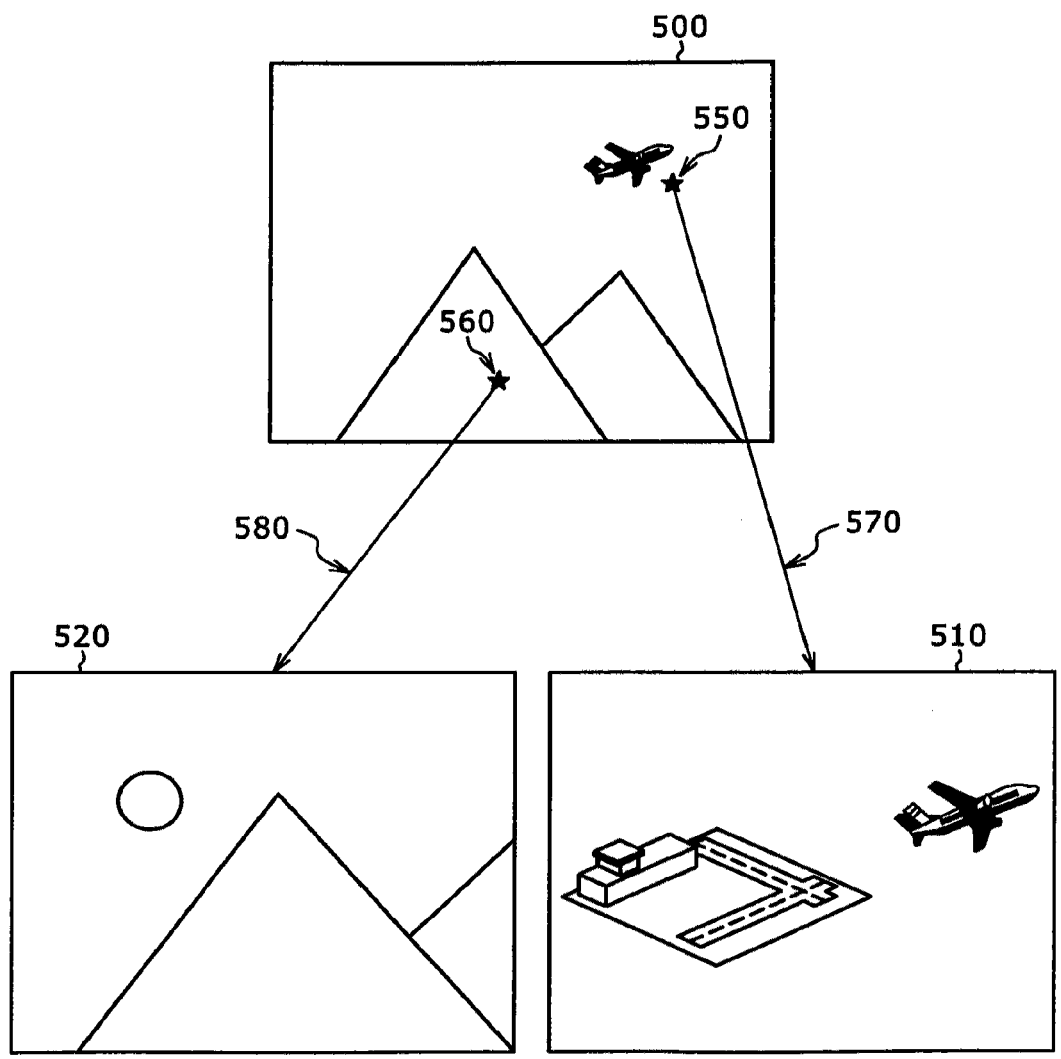
FIG. 18 is a diagram showing an example of utilizing the link of image data in the modified example of the embodiment of the present invention.

FIG. 18 is a diagram showing an example of utilizing a link of the image data in the modified example of the embodiment of the present invention. In FIG. 18, the first button 550 and the second button 560 are embedded in the first image data 500. In this case, when the first button 550 is clicked 570, the second image data 510 is displayed in a manner the data is placed over the first image data 500. On the other hand, when the second button 560 is clicked 580, the third image data 520 is displayed.

In this way, according to the modified example of the embodiment of the present invention, the link showing an association between a specific location (coordinates) of the parent image data and the child image data is managed in the link management database 130 to enable easy viewing of other image data associated with the parent image data.

It is noted that the embodiment of the invention presents one example for implementing the invention, and has the corresponding relations with items specifying the invention in claims individually as described below. However, the invention should not be limited thereto, but can be modified in various manners within the scope not departing from the gist of the invention.

That is, according to an embodiment of the present invention, image-data holding means corresponds to the image database 120, for example. Link management means corresponds to the link management database 130, for example. Operation receiving means corresponds to the operation receiving unit 110, for example. Further, display controlling means corresponds to the display controller 150, for example.

Further, according to an embodiment of the present invention, image-data holding means corresponds to the image database 120, for example. Link management means corresponds to the link management database 130, for example. An operation receiving procedure corresponds to the step S911, for example. A display controlling procedure corresponds to the steps S921 and S924, for example.

It is noted that the procedures, as described in the embodiment of the present invention, may be perceived as a method having those series of procedures, a program for causing a computer to execute those series procedures, or a recording medium for storing the program.

According to embodiments of the present invention, an excellent effect in which an association between imaged image data is flexibly managed for enabling easy view of the relevant plurality of image data may be provided.

It should be understood by those skilled in the art that various modifications, combinations, sub-combinations and alterations may occur depending on design requirements and other factors insofar as they are within the scope of the appended claims or the equivalents thereof.

What is claimed is:

1. An image display controlling apparatus including a processor and a memory, comprising: image-data maintaining means for maintaining a plurality of image data; link management means for managing a link representing a parent-child relationship of parent image data and child image data between two image data in the plurality of image data; operation receiving means for receiving operation input relating to a display of the plurality of image data; and a display controller for controlling such that switching is performed between a whole display in which all of the plurality of image data is subject to be displayed and a digest display in which image data other than those which are the child image data by the link, out of the plurality of image data, are subject to be displayed in response to the operation input, the whole display and the digest display are each displayed with an image operating area which includes a parent image area, a child image area, and a selection frame, the selection frame indicating a parent image in the parent image area, the child image area including a plurality of child images linked to the parent image indicated by the selection frame, and an image indicated by the selection frame being highlighted in the whole display or the digest display, the selection frame surrounding image data corresponding to one parent image and image data corresponding to one child image linked to the one parent image, the image display controlling apparatus being operable to establish a link representing a parent-child relationship when an image in the child image area of the image operating area is placed over an image in the parent image area of the image operating area, and when an image in the parent image area of the image operating area is placed over another image in the parent image area of the image operating area, wherein when an image in the parent image area of the image operating area is placed over another image in the parent image area of the image operating area the image placed over becomes a child of the another image.

2. The image display controlling apparatus according to claim 1, wherein:
the display controller controls such that in the whole display, the child image data is displayed behind the parent image data thereof.

3. The image display controlling apparatus according to claim 1, wherein:
the image-data holding means holds a predetermine date and time accompanied with each of the plurality of image data; and
the display controller controls such that the image data other than those which become the child image data by the link are displayed chronologically according to the predetermined date and time accompanied with each image data.

4. The image display controlling apparatus according to claim 1, wherein:
the display controller controls such that in the whole display, the child image data is displayed to be smaller than the parent image data.

5. The image display controlling apparatus according to claim 1, wherein:
the image-data holding means holds a hidden image attribute which is accompanied with each of the plurality of image data to indicate whether the image data should be hidden or not; and
the display controller controls whether the image data set to be hidden by the hidden image attribute should be displayed or not in response to the operation input.

6. The image display controlling apparatus according to claim 5, wherein:
the display controller controls such that when the image data set to be hidden by the hidden image attribute is displayed, the image data is displayed translucently.

7. The image display controlling apparatus according to claim 1, wherein:
the operation receiving means receives an operation where an icon indicating the second image data is placed over a display area showing the first image data in the plurality of image data; and
the display controller causes the link management means to hold a new link in which the first image data is the parent image data and the second image data is the child image data.

8. The image display controlling apparatus according to claim 1, wherein:
the operation receiving means receives an operation where an icon indicating any of the plurality of image data is placed over an area for receiving a link cancel; and
the display controller causes the link management means to cancel a link associated with the image data indicated by the icon.

9. The image display controlling apparatus according to claim 1, wherein:
the link management means further manages a link representing a parent-child relationship between a specific position in the parent image data and the child image data; and
the display controller controls such that the child image data is displayed in the specific position in the parent image data.

10. The image display controlling apparatus according to claim 9, wherein:
the operation receiving means receives an operation where an icon indicating the second image data is placed over the specific position of the display area indicating the first image data in the plurality of image data; and
the display controller causes the link management means to hold a new link in which the specific position of the first image data is a specific position of the parent image data and the second image data is the child image data.

11. An image display controlling method of an image display controlling apparatus including: image-data holding means for holding a plurality of image data; and link management means for managing a link representing a parent-child relationship of parent image data and child image data between two image data in the plurality of image data, the image display controlling method, comprising: an operation receiving procedure for receiving operation input relating to a display of the plurality of image data; and a display controlling procedure for switching between a whole display in which all of the plurality of image data are subject to be displayed and a digest display in which image data other than those which are the child image data by the link, out of the plurality of image data, are subject to be displayed, in response to the operation input; the method comprising using a display controller to perform the display controlling procedure, the whole display and the digest display are each displayed with an image operating area which includes a parent image area, a child image area, and a selection frame, the selection frame indicating a parent image in the parent image area, the child image area including a plurality of child images linked to the parent image indicated by the selection frame, and an image indicated by the selection frame being highlighted in the whole display or the digest display, the selection frame surrounding image data corresponding to one parent image and image data corresponding to one child image linked to the one parent image, the image display controlling apparatus being operable to establish a link representing a parent-child relationship when an image in the child image area of the image operating area is placed over an image in the parent image area of the image operating area, and when an image in the parent image area of the image operating area is placed over another image in the parent image area of the image operating area, wherein when an image in the parent image area of the image operating area is placed over another image in the parent image area of the image operating area the image placed over becomes a child of the another image.

12. A non-transitory computer-readable medium having stored there on a computer-readable program, the program being usable in an image display controlling apparatus including image-data holding means for holding a plurality of image data and link management means for managing a link representing a parent-child relationship of parent image data and child image data between two image data in the plurality of image data, for causing a computer to execute methods comprising: an operation receiving procedure for receiving operation input relating to a display of the plurality of image data; and using a display controller to perform a display controlling procedure for performing switching between a whole display in which all of the plurality of image data are subject to be displayed and a digest display in which image data other than those which are the child image data by the link, out of the plurality of image data, are subject to be displayed in response to the operation input, the whole display and the digest display are each displayed with an image operating area which includes a parent image area, a child image area, and a selection frame, the selection frame indicating a parent image in the parent image area, the child image area including a plurality of child images linked to the parent image indicated by the selection frame, and an image indicated by the selection frame being highlighted in the whole display or the digest display, the selection frame surrounding image data corresponding to one parent image and image data corresponding to one child image linked to the one parent image, the image display controlling apparatus being operable to establish a link representing a parent-child relationship when an image in the child image area of the image operating area is placed over an image in the parent image area of the image operating area, and when an image in the parent image area of the image operating area is placed over another image in the parent image area of the image operating area, wherein when an image in the parent image area of the image operating area is placed over another image in the parent image area of the image operating area the image placed over becomes a child of the another image.

13. An image display controlling apparatus including a processor and a memory, comprising: an image-data maintaining section to maintain a plurality of image data; a link management section to manage a link representing a parent-child relationship of parent image data and child image data between two image data in the plurality of image data; an operation receiving section to receive operation input relating to a display of the plurality of image data; and a display controller to control such that switching is performed between a whole display in which all of the plurality of image data is subject to be displayed and a digest display in which image data other than those which are the child image data by the link, out of the plurality of image data, are subject to be displayed in response to the operation input, the whole display and the digest display are each displayed with an image operating area which includes a parent image area, a child image area, and a selection frame, the selection frame indicating a parent image in the parent image area, the child image area including a plurality of child images linked to the parent image indicated by the selection frame, and an image indicated by the selection frame being highlighted in the whole display or the digest display, the selection frame surrounding image data corresponding to one parent image and image data corresponding to one child image linked to the one parent image, the image display controlling apparatus being operable to establish a link representing a parent-child relationship when an image in the child image area of the image operating area is placed over an image in the parent image area of the image operating area, and when an image in the parent image area of the image operating area is placed over another image in the parent image area of the image operating area, wherein when an image in the parent image area of the image operating area is placed over another image in the parent image area of the image operating area the image placed over becomes a child of the another image.

* * * * *